(12) United States Patent
Johri

(10) Patent No.: US 10,705,619 B2
(45) Date of Patent: Jul. 7, 2020

(54) SYSTEM AND METHOD FOR GESTURE BASED DATA AND COMMAND INPUT VIA A WEARABLE DEVICE

(71) Applicant: Abhishek Johri, Rajasthan (IN)

(72) Inventor: Abhishek Johri, Rajasthan (IN)

( * ) Notice: Subject to any disclaimer, the term of this patent is extended or adjusted under 35 U.S.C. 154(b) by 206 days.

(21) Appl. No.: 15/528,458

(22) PCT Filed: Nov. 21, 2014

(86) PCT No.: PCT/JP2014/005863
§ 371 (c)(1),
(2) Date: May 19, 2017

(87) PCT Pub. No.: WO2016/079774
PCT Pub. Date: May 26, 2016

(65) Prior Publication Data
US 2017/0315620 A1  Nov. 2, 2017

(51) Int. Cl.
*G06F 3/01* (2006.01)
*G06F 3/03* (2006.01)
(Continued)

(52) U.S. Cl.
CPC .............. *G06F 3/017* (2013.01); *G06F 3/011* (2013.01); *G06F 3/014* (2013.01); *G06F 3/0233* (2013.01);
(Continued)

(58) Field of Classification Search
CPC ........ G06F 3/017; G06F 3/011; G06F 3/0233; G06F 3/014; G06F 3/0304;
(Continued)

(56) References Cited

U.S. PATENT DOCUMENTS

2002/0024500 A1* 2/2002 Howard .................. G06F 3/014
345/158
2014/0055352 A1* 2/2014 Davis ...................... G06F 3/017
345/156
(Continued)

FOREIGN PATENT DOCUMENTS

JP      H0683512     3/1994
JP      2000298544   10/2000
(Continued)

OTHER PUBLICATIONS

PCT Search Report for corresponding PCT International Application No. PCT/JP2014/005863 dated Feb. 10, 2015, 3 pages.

*Primary Examiner* — Rodney Amadiz

(57) ABSTRACT

The present invention relates to an electronic wrist wearable device that uses image and inertia sensors to track motion of hand and wrist of a user, and is able to determine locations (relative to a stationary object in physical environment), and discrete and motion hand gestures. The wearable device can also emulate various data input devices by matching the determined gestures with preregistered gestures and sending the data associated with the matched gesture to a relevant computer device. The wearable device can also send the said tracking information of the hand and the wrist to at least one external computer, which can process the received information to simulate hand motion, and to determine discrete and motion hand gestures. The said computer can also emulate various data input devices by matching the determined gestures with preregistered gestures and using the data associated with the matched gesture.

21 Claims, 16 Drawing Sheets

(51) Int. Cl.
    *G06F 3/0346*     (2013.01)
    *G06F 3/023*     (2006.01)
    *G06F 3/0488*     (2013.01)
    *G06T 7/73*     (2017.01)
    *G06F 3/038*     (2013.01)
    *G06T 7/40*     (2017.01)

(52) U.S. Cl.
    CPC .......... *G06F 3/0238* (2013.01); *G06F 3/0304* (2013.01); *G06F 3/0346* (2013.01); *G06F 3/04886* (2013.01); *G06F 3/038* (2013.01); *G06T 7/40* (2013.01); *G06T 7/73* (2017.01)

(58) Field of Classification Search
    CPC .. G06F 3/04886; G06F 3/0238; G06F 3/0346; G06F 3/038; G06T 7/40; G06T 7/73
    See application file for complete search history.

(56) References Cited

U.S. PATENT DOCUMENTS

| | | | |
|---|---|---|---|
| 2014/0065588 A1* | 3/2014 | Jacobson | G09B 23/283 434/263 |
| 2014/0098018 A1 | 4/2014 | Kim et al. | |
| 2014/0267024 A1* | 9/2014 | Keller | G06F 3/017 345/156 |
| 2015/0022446 A1* | 1/2015 | Asplund | G06F 3/014 345/157 |
| 2015/0063661 A1* | 3/2015 | Lee | G06F 3/011 382/124 |
| 2015/0193014 A1* | 7/2015 | Yamada | G06F 1/1615 345/156 |
| 2015/0323998 A1* | 11/2015 | Kudekar | G06F 1/163 345/156 |
| 2015/0341536 A1* | 11/2015 | Huang | H04N 5/2328 348/208.2 |
| 2016/0259958 A1* | 9/2016 | Nara | G06K 7/10722 |
| 2018/0088673 A1* | 3/2018 | Bhalla | H04W 4/80 |
| 2018/0188894 A1* | 7/2018 | Feinstein | G06F 1/163 |
| 2019/0066300 A1* | 2/2019 | Bar Zvi | G06K 9/00382 |

FOREIGN PATENT DOCUMENTS

| | | |
|---|---|---|
| JP | 2005301583 | 10/2005 |
| WO | WO2012056864 | 5/2012 |

* cited by examiner

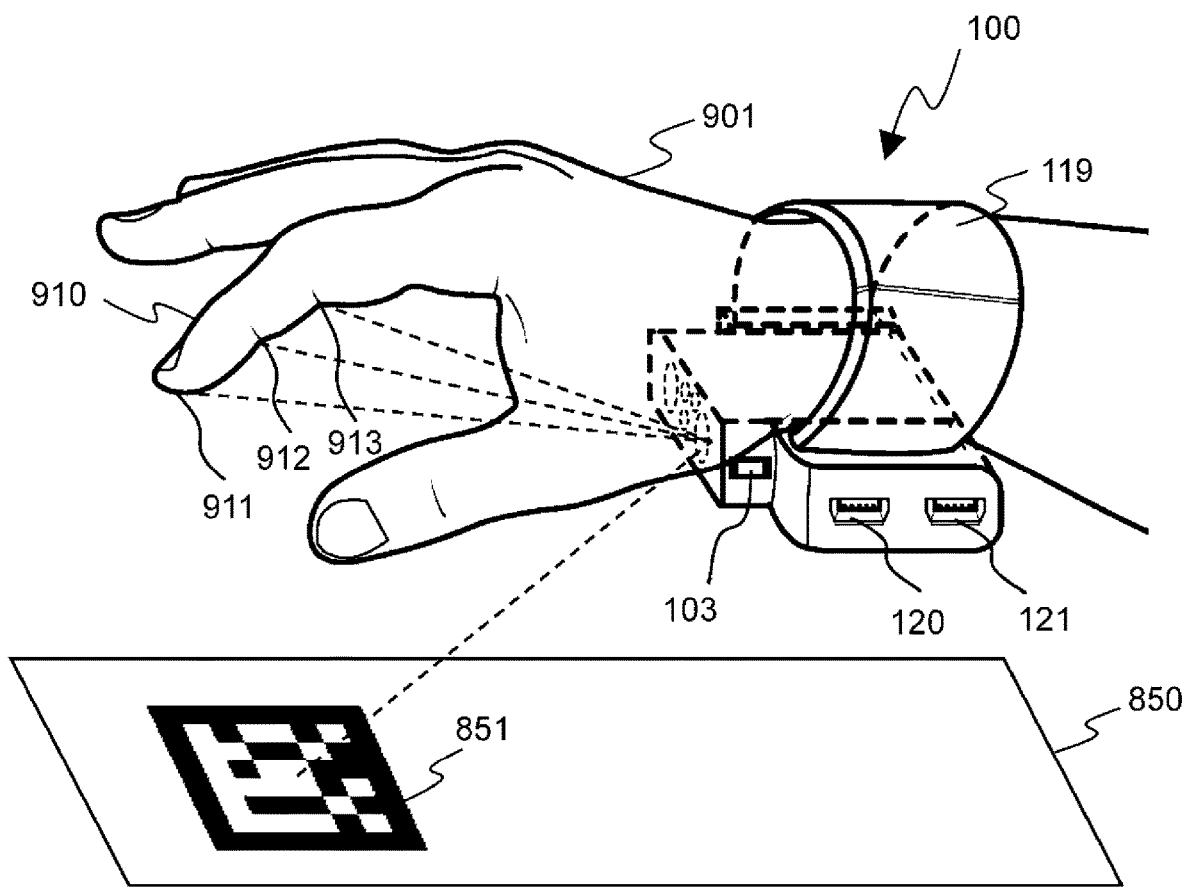
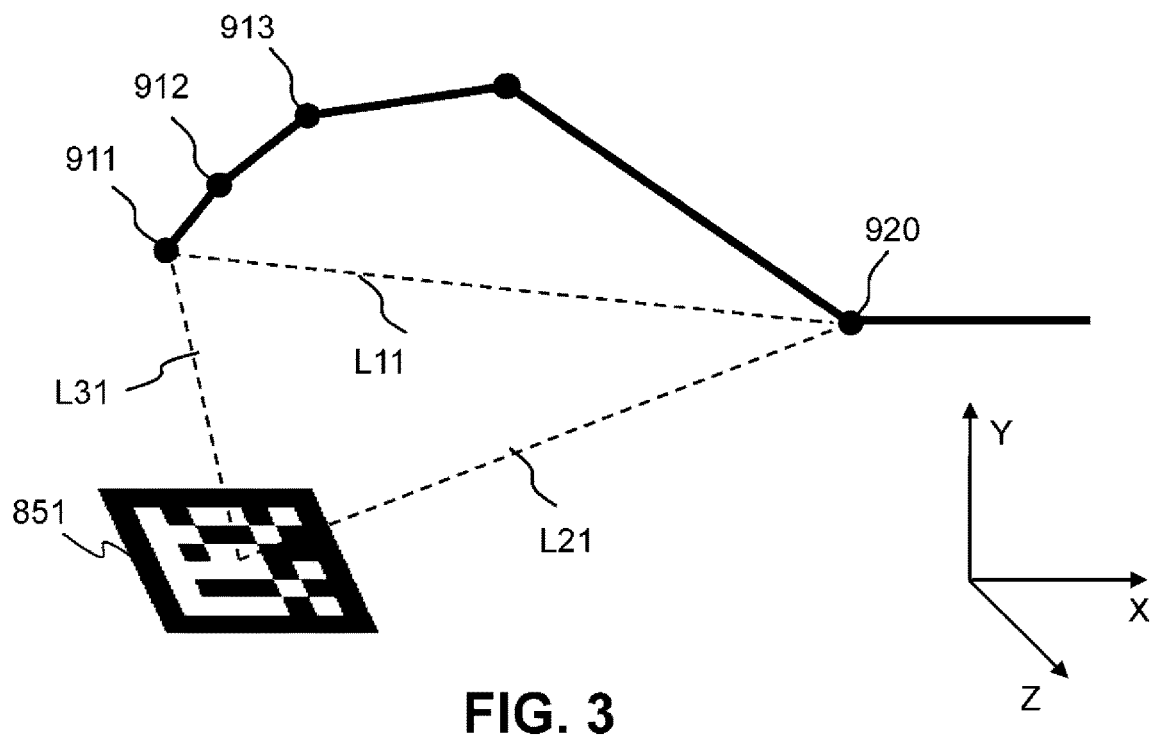
FIG. 3

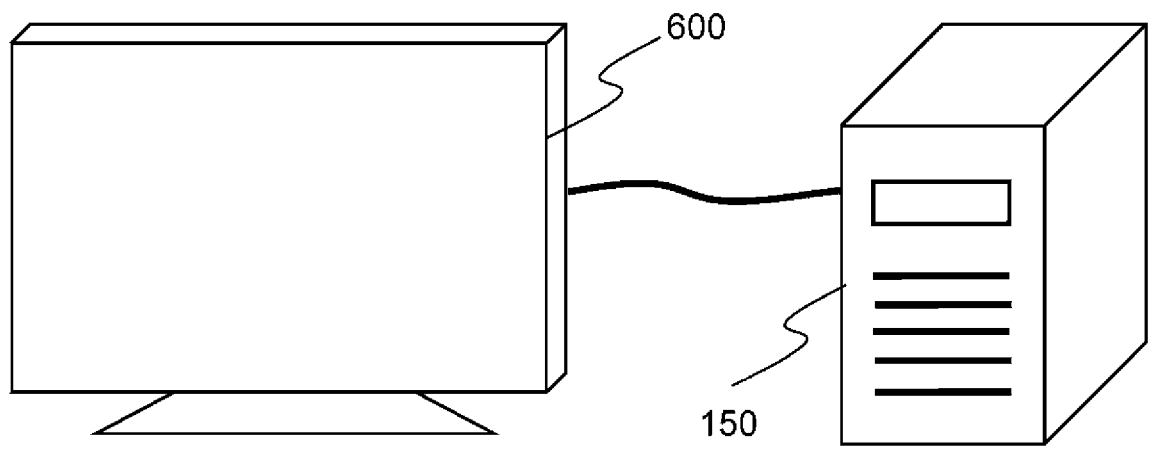
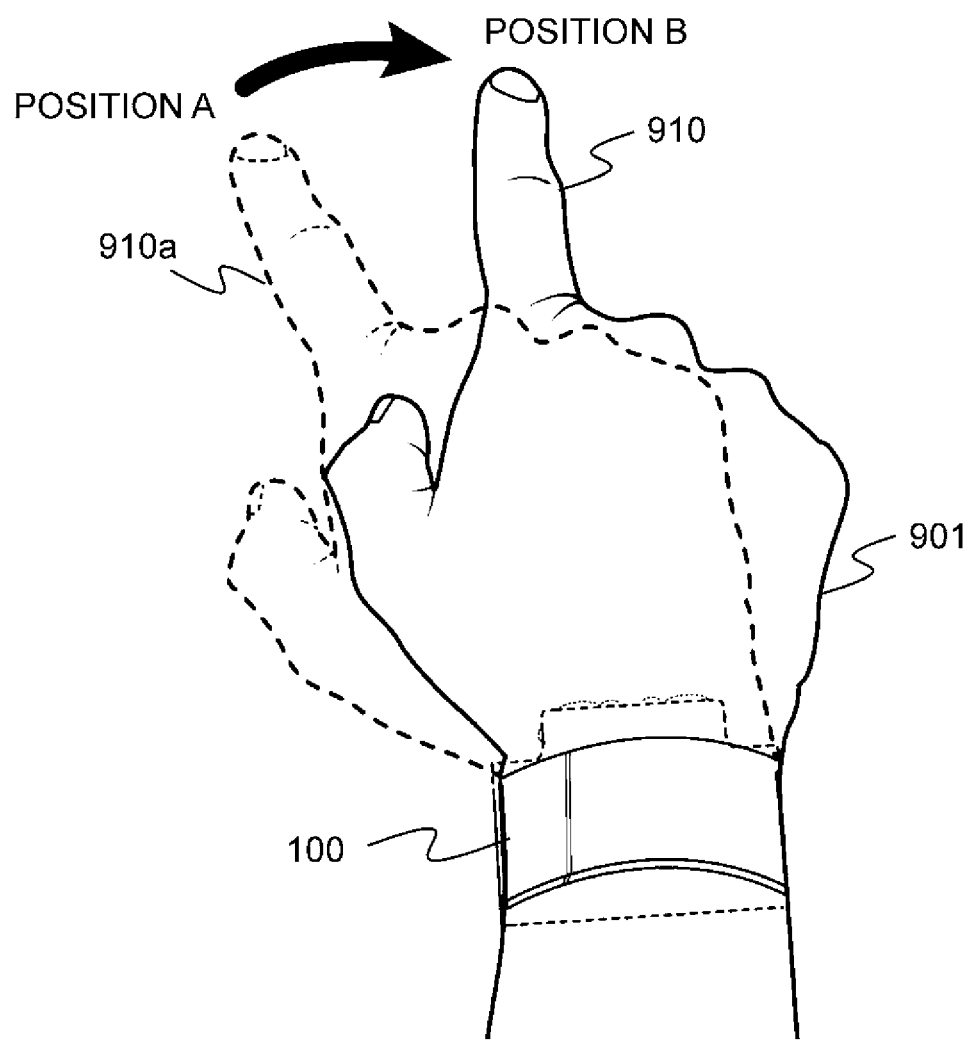
FIG. 4

| DEVICE FOR EMULATION | | HAND GESTURE | | | WRIST GESTURE | | LOCATION (X,Y,Z) | | DATA TO SEND |
|---|---|---|---|---|---|---|---|---|---|
| 511 CATEGORY | 512 DEVICE | 521 FINGER | 522 DISCRETE | 523 MOTION | 531 DICRETE | 532 MOTION | 541 FINGER | 542 WRIST | 550 |
| COMPUTER KEYBOARD | ENGLISH QWERTY KEYBOARD | ANY | - | KEY PRESS | - | - | X1,Y1,Z1 | - | "Q" KEY PRESS COMMAND |
| | USER DEFINED 1 | ... | ... | ... | ... | ... | ... | ... | ... |
| COMPUTER MOUSE | MOUSE 1 | INDEX FINGER | - | TAP | - | - | - | - | MOUSE LEFT BUTTON CLICK COMMAND |
| | | INDEX FINGER | TOUCHING A SURFACE | MOVE IN X,Y PLANE | - | MOVE IN X,Y PLANE | - | - | MOUSE MOVE COMMAND |
| MUSIC KEYBOARD | 88 KEY PIANO KEYBOARD | ANY | - | KEY PRESS | - | - | X2,Y2,Z2 | X7,Y7,Z7 | COMMAND FOR 88th KEY PRESS |
| | | | | | | | X3,Y3,Z3 | X8,Y8,Z7 | COMMAND FOR 87TH KEY PRESS |
| | USER DEFINED 2 | ... | ... | ... | ... | ... | ... | ... | ... |
| VIDEO GAME REMOTE CONTROL | WELL KNOWN REMOTE 1 | THUMB | - | BUTTON PRESS | - | - | X4,Y4,Z4 | X9,Y9,Z9 | BUTTON B1 PRESS COMMAND |
| | | - | - | - | - | MOVE IN X,Y PLANE | - | - | JOYSTICK MOVE COMMAND |
| | USER DEFINED 3 | ... | ... | ... | ... | ... | ... | ... | ... |
| INFRA RED REMOTE CONTROL | TELEVISION 1 GESTURE REMOTE | INDEX FINGER | OPENED STRAIGHT | ... | ... | ... | ... | ... | COMMAND TO SELECT VOLUME CONTROL |
| | | INDEX FINGER | - | MOVE IN X,Y PLANE | ... | ... | ... | ... | COMMAND TO CHANGE PARAMETER |
| | USER DEFINED 4 | ... | ... | ... | ... | ... | ... | ... | ... |
| CUSTOM | USER DEFINED 5 | ... | ... | ... | ... | ... | ... | ... | ... |
| ... | | | | | | | | | |

FIG. 5

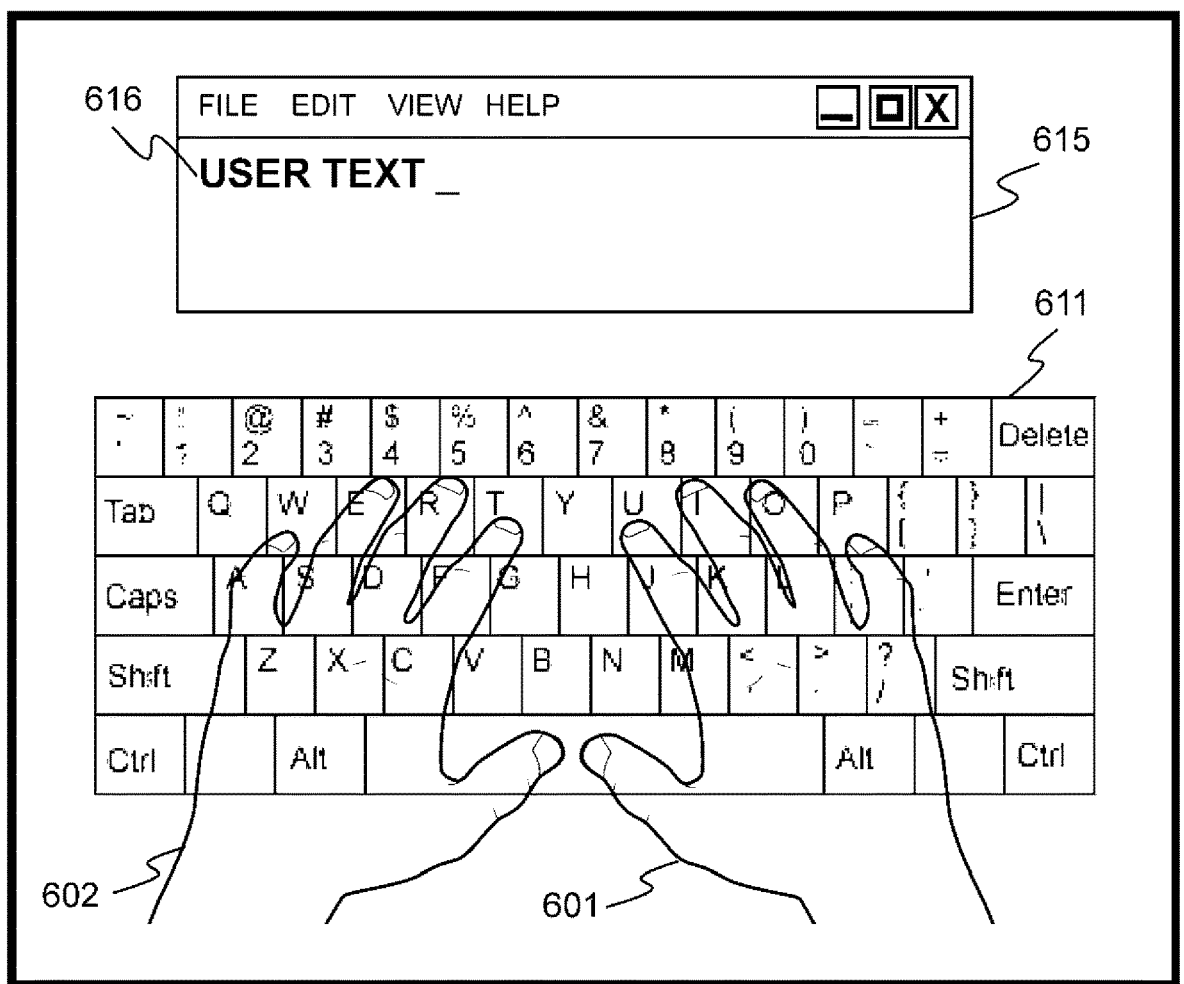
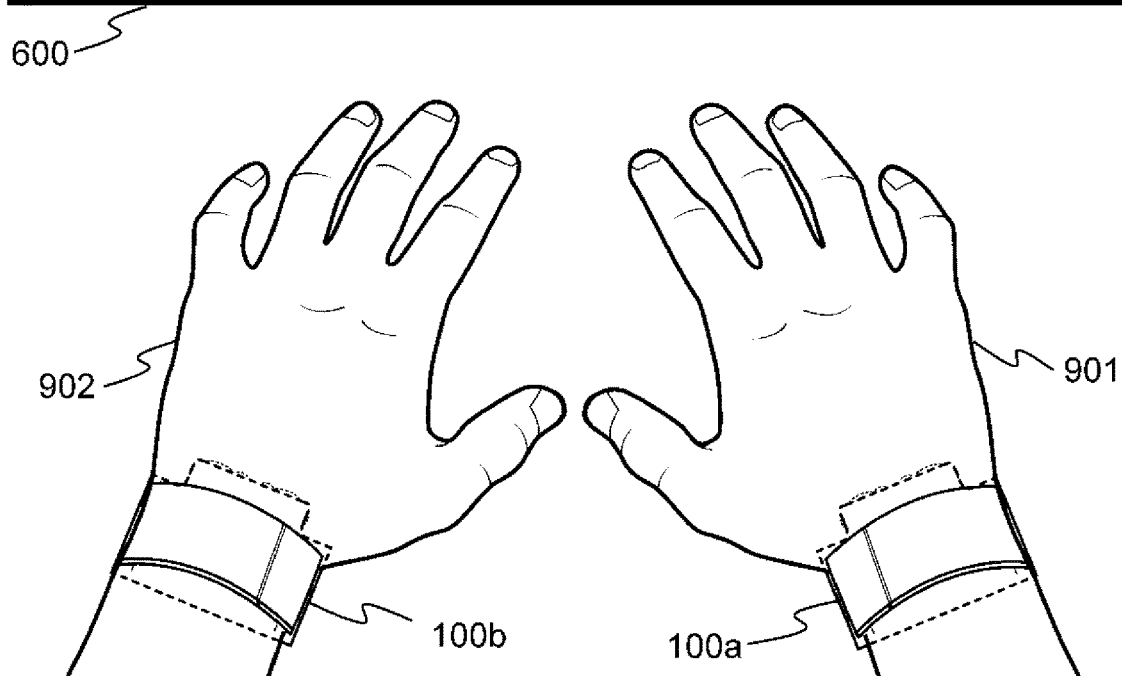
FIG. 6

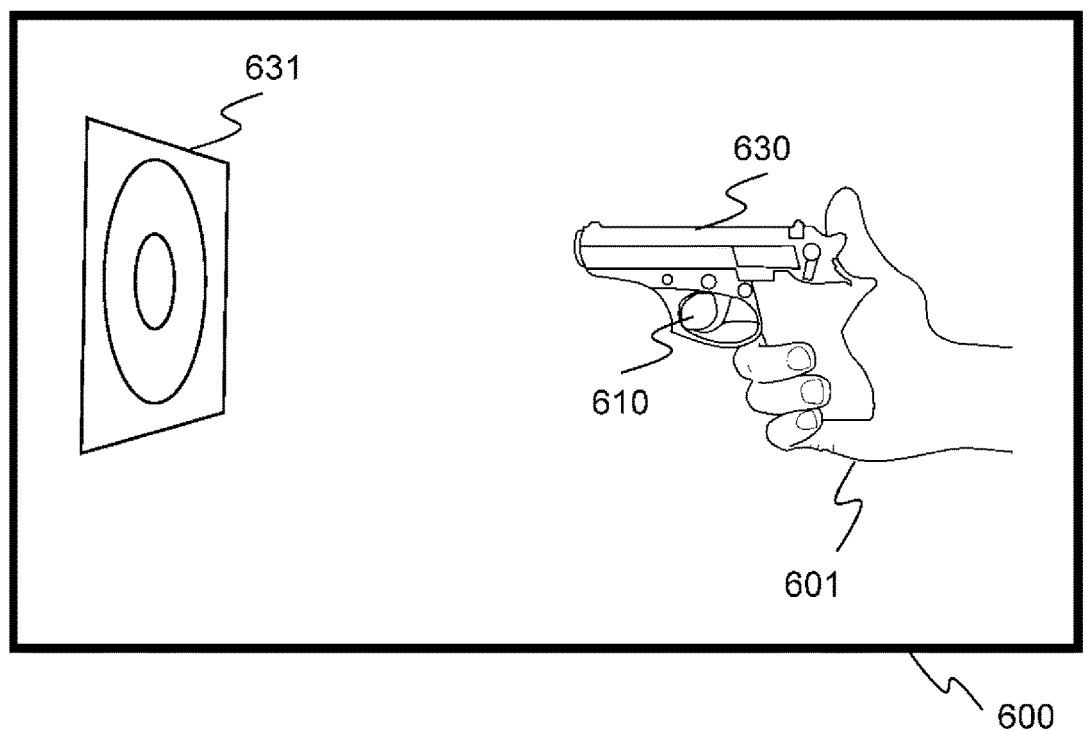
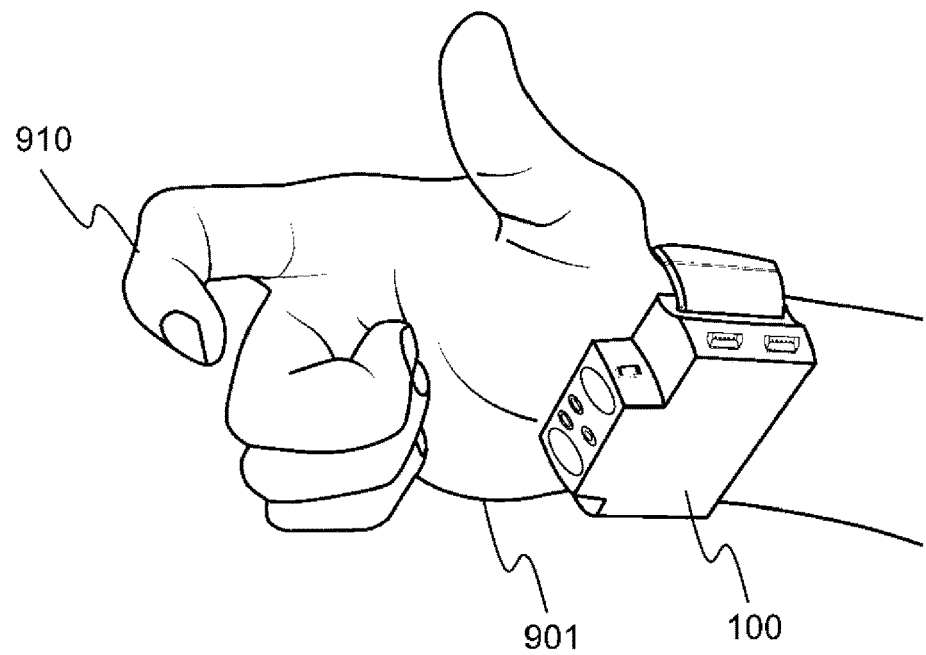
FIG. 8

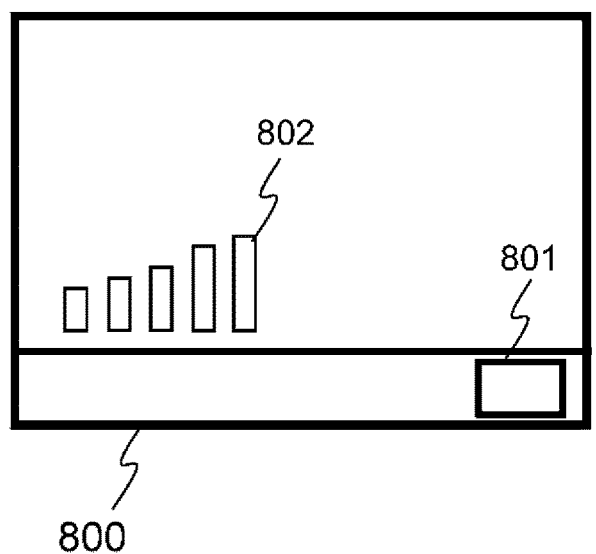
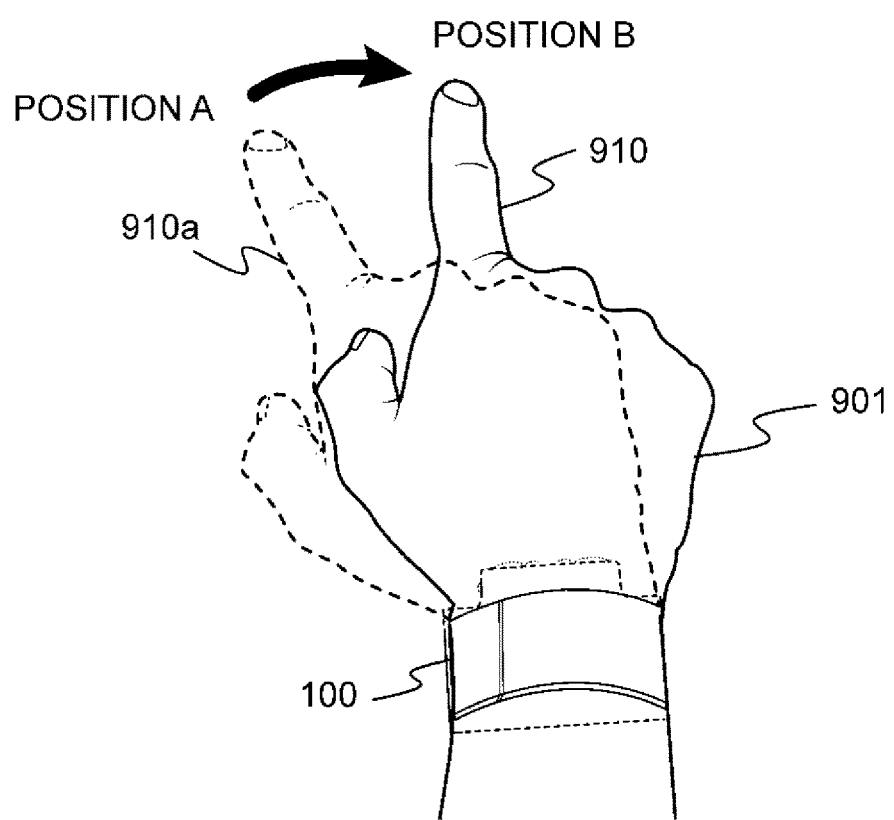
FIG. 9

SYSTEM AND METHOD FOR GESTURE BASED DATA AND COMMAND INPUT VIA A WEARABLE DEVICE

This Application is a US National stage of PCT/JP2014/005863 filed Nov. 21 2014, which is incorporated herein by reference.

TECHNICAL FIELD

The present invention is related to a wrist wearable electronic device used to simulate hand motion and to emulate various well known data and command input devices such as keyboard, mouse, remote control, etc. for various computer devices such as desktop computer, tablet computer, video game console, etc. and home appliances such as television, etc. The present invention also relates to digital image processing and gesture recognition. In particular, the present invention tracks movement of hand and wrist, and determines various hand and wrist gestures and sends relevant data to computer devices in order to emulate data input devices, and also to simulate hand motion.

BACKGROUND ART

Over the years, digital image processing has advanced and gesture recognizing intelligent devices such as the gaming device 'XBOX Kinect' from Microsoft Corporation are finding their ways in consumer market. On the other hand, electronic components are getting smaller and less power consuming. This has led to new breed wearable computer devices such as the wearable computer device 'Samsung Gear' from Samsung Corporation, and eye glass type wearable computer 'Google Glasses' by Google Inc.

With the advent of small wearable computer devices it has become a challenging task to efficiently provide data or command input to these devices. Also, there is a need for a wearable device that can be used as data or command input device to various computer devices including gaming devices.

Speech recognition based data input methods are available but because of inherent noise, and different accents and speaking speeds of user the speech recognition technology is prone to high error rate, thus this technology has not been widely accepted, and using standard size computer keyboards for inputting data are still prevalent. Compact tablet computers have an onscreen keyboard yet it is a common trend to use wireless standard size keyboard for data input.

In video game industry, the 'XBOX Kinect' device from Microsoft Corporation is a well known gesture recognition device that captures human body motions and is used for controlling video game functions. However, using 'Kinect' in its present form or similar technologies it is difficult to precisely track complex or small variations in the movement of fingers of a user, because of their distant stationary architecture which result in significant error in depth analysis of small items like finger tips. This is one of the reasons that handheld controllers are still prevalent.

Hence, there are needs for a smart wearable device that can be used as data input device for various computer devices or remote controlled appliances. Research related to this requirement has already started and some technologies like those disclosed in PTL 1, PTL2, and PTL3 are some examples of current technological advancement in the field. However, the said technologies have many shortcomings which prevent them to fulfill user requirements. These shortcomings are described in the 'Technical Problem' section of this document.

The current invention not only overcome the shortcomings of the prior art but also provide new features to enhance ability of user interaction with various computer devices.

SUMMARY OF INVENTION

Technical Problem

The typing technology disclosed in PTL 1, requires user to tap his fingers on a surface in order to determine a keystroke, because the disclosed technology is dependent on edge detection at collision point of finger and surface. It may not detect a keystroke action (an up-down motion of a finger) when the finger is not touching any surface. The embodiments also do not describe any method to determine many other gestures like a left right motion of index finger not touching any surface, or a simple hand waving motion.

The technology disclosed in PTL 1 uses single camera and finger edge detection method, with such method the depth of field can not be determined accurately, limiting the usage of the disclosed technology. For example, provided the wrist is stationary, the disclosed technology will not be able to easily differentiate between tapping of surface by index finger at a point and at a point 5 mm away in line of sight of the camera. This limitation is implicit with the description that only surface taps are recognized and the relative location of the tap is not determined, requiring a combination of finger taps for inputting a single alphanumeric key (refer coding table in embodiment of PTL 1). Such keyboard emulation makes it very difficult to use for a user accustomed to using QWERTY layout keyboard which requires only a single keystroke for inputting an alphanumeric symbol. With the same reason, the disclosed technology is either not be able to simulate or simulate with large degree of error, if working as a pointing device like a computer mouse.

The data input device disclosed in PTL 2, is worn on user's palm, and the image sensors onboard the device track fingers' movements and the device convert these movements to user commands. Since this device is attached to the user's palm, the relative motion between the palm and the image sensors is zero. Hence, the device may not be able to track the movements of palm only by using image sensors, specially in a uniform background. For example, while simulating the keystrokes on a QWERTY layout computer keyboard, if the user does action of pressing the alphabet key "J" from index finger of right hand then turn its right hand palm a little toward left and does action of pressing the alphabet key "H". The device will not be able to differentiate between these two keystroke actions. With the same reason, in a uniform background the device may not be able to determine simple waving or patting motion of palm when the fingers are stationary with respect to the palm resulting in no relative motion between the image sensors and fingers.

The wearable sensor device disclosed in PTL 3 determines position of finger tips, etc. relative to wrist. Now, if the wrist moves, the wearable device uses data from inertia measurement unit to estimate location of the wrist relative to an initial position of the wrist. However, the determined wrist location may not be correct because inertia measurement unit is not a precision location determination device as it suffers from 'accumulated error' on prolong use. To determine relative position of the wrist, the inertia measurement unit uses for example 'Dead Reckoning' technique which is prone to 'accumulated error' and hence can not be trusted for precise location determination.

Similarly, when simulating the movements of both hands, it may be required to determine the location of both wrists relative to a common reference point, or the distance between the two hands of a user. However, the distance calculated by the said wearable sensor device between the two hands using only the information from inertia measurement unit may not be correct due to following two reasons.

First reason is the said 'accumulated error'. Second reason may be an unknown initial distance between the two wrists at the time when the inertia measurement unit starts keeping track of relative motion of the wrists. Using the inertia information only the displacement from an initial position of the wrist can be determined but if the initial distance between the two wrists is unknown, the distance between the two wrists at a point in time can not be determined.

Solution to Problem

The above mentioned problems can be solved with the present invention. The present invention describes an electronic wrist wearable device comprising stereo image sensors to precisely track the motion of user's hand, and at least one stationary object situated in physical environment. By processing the stereo images, the said wearable device is able to determine location of the hand and the wrist, relative to its physical environment. Thus, even if the wrist moves around, its relative location can be determined precisely.

The wearable device can comprise secondary sets of image sensors facing different axis, in order to improve the possibility of detecting at least one stationary object in the physical environment, or to determine location of second wrist of the user. The said wearable device also comprises an Inertia Measurement Unit to supplement the determined location of the wrist, and in turn the relative location of the hand.

The image processing used in this invention can track all the articulated parts of a hand, and the gesture recognition has no limitation to fingertip and surface collision detection. Hence, even if user makes a keystroke action in air without touching any surface, a keystroke can be detected.

Since the image sensors and the Inertia Measurement Unit are located on the wrist, all the hand movement including the movement when relative motion of fingers and palm is zero, can also be tracked precisely. The said wearable device can also determine discrete and motion gestures of the hand and the wrist, and can collaborate with an external computer device to share the data processing required for determining the gestures.

The wearable device is also able to communicate with various computer devices, and is able to emulate well known or user defined data input devices. The wearable device matches the determined hand gestures with a set of hand gestures that are preregistered for a data input device that is being emulated, and if a match is found, the wearable device sends data, which is registered for the matched hand gesture, to at least one external computer device. The external computer device may detect the wearable device as the said data input device. Upon receiving the said data from the wearable device, the external computer device can function similar to the case when the same data is received from the said data input device.

Depending on the data processing mode, the wearable device can also send the images captured by the image sensors, or the determined relative location information of the hand and the wrist, to at least one external computer. The said external computer processes the received information to determine hand and wrist gestures, and can generate data relevant to the determined gesture. With this method, the wearable device can emulate multiple types of data input devices without the need to change its program or data set for each data input device.

The present invention also provides methods for simulating the hand and the wrist of a user. In one embodiment, simulation of the hand and the wrist is used in combination with simulation of a data input device, in order to enable the user to operate the simulated virtual data input device. With this visual feedback of current location of hand over the said virtual data input device, user can adjust its hand (fingers) over the location of a particular key or a button, etc. which the user wants to press or operate. This method can eliminate the limitation for a user to remember the layout and exact locations of the keys or buttons, etc. of the said data input device.

The wearable device also comprise of Infra Red signal transceivers enabling the wearable device to control various Infra Red remote control operated appliances such as television, DVD player, etc., by making relevant hand gestures.

It is also possible for a plurality of the wearable devices to communicate with each other. Especially, in a case when the user wears one wearable device on each of its wrists, the wearable devices on both the wrists can communicate with each other, enabling determination of a combined gesture of both the hands.

Advantageous Effects of Invention

The wearable device and the methods disclosed in present invention provide a compact and easy to use alternative to various conventional data input devices. The present invention is able to emulate various data input devices such as computer keyboard, computer mouse, video game controller, television remote control, etc. Thus only by making relevant hand gestures user can provide data input to various computer devices such as general purpose computer, tablet computer, smart phone, video game console, and also to home appliances such as television, DVD player, etc.

BRIEF DESCRIPTION OF DRAWINGS

FIG. 3 illustrates an example of determination of relative location of articulated parts of index finger and wrist.

FIG. 4 illustrates an example of determination of hand gesture when the positions of fingers relative to palm do not change.

FIG. 5 is an example of 'Emulation Device Table' 500 used to register the configuration information of each data input device to be emulated by the wearable device 100.

FIG. 6 illustrates a system where the wearable device 100 is used to simulate a computer keyboard and hands of a user.

FIG. 8 illustrates a system where the wearable device 100 is used as a hand gesture type video game controller.

FIG. 9 illustrates an example case where the wearable device 100 emulates a hand gesture based television remote control.

DESCRIPTION OF EMBODIMENTS

Hereinafter, embodiments of the present invention will be described with reference to the accompanying drawings. It should be noted that the embodiments are merely examples to realize this invention and are not to limit the technical scope of this invention. Throughout the drawings, elements common to some drawings are denoted by the same reference signs unless particularly explained. The reference number of an element when shown in plurality or to illustrate previous position of the element in a drawing, is suffixed by a lower case alphabet (a,b, etc). In this document the term 'hand' refers to a combination of palm and all the fingers of a hand but does not include arm; the term 'location' refers to location in 3 dimension space; the term 'location of finger' may refer to a set of locations consisting of locations of fingertip, Distal Inter-Phalangeal joint (DIP hereinafter), and Proximal Inter-Phalangeal joint (PIP hereinafter) of the said finger.

The following explanations on data processing in the embodiments of this invention will be provided with subjects (agents) of program; however, they may have the subjects of processor, or the device containing the processor, because a processor executes a program using memories and communication ports to perform predetermined processing.

Example 1

This embodiment of the present invention explains an electronic wrist wearable device 100 that uses image and inertia sensors to track the motion of hand and wrist of a user, and is able to determine gestures of the hand and the wrist. The wearable device 100 is able to communicate with various computer devices and send them the tracking information of the hand and the wrist. The wearable device 100 can also emulate various data input devices for example keyboard type devices such as computer keyboard, electronic keyboard (musical instrument), etc.; pointing devices such as computer mouse, touch pad, etc.; Infra Red remote control units such as television remote; button and joystick type video game controller, etc. The wearable device can provide data or command input to various computer devices such as desktop computer, laptop computer, tablet computer, smart phone, video game console, wearable computer device, and also to Infra Red remote control operated home appliances (where installing user programs is not readily possible) such as television, air conditioner, DVD player, music system, etc.

Figure 1:
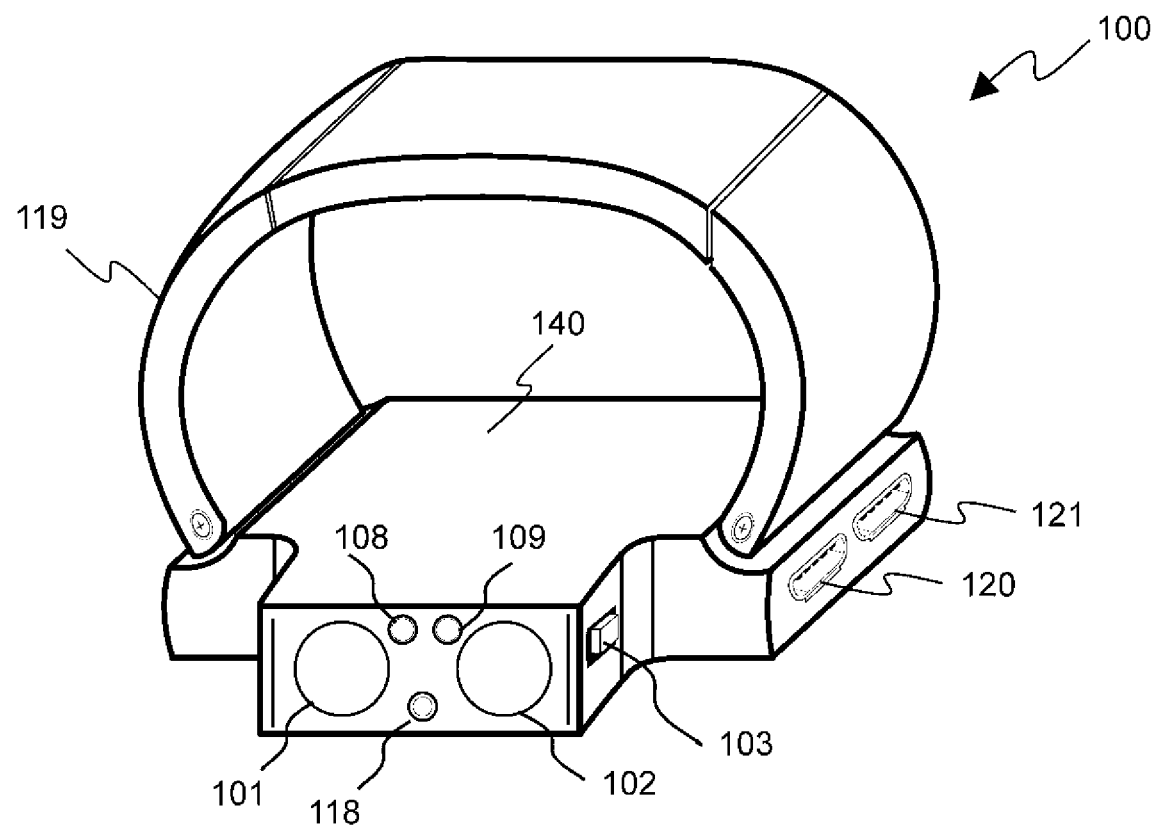
FIG. 1 illustrates an example structure of wearable device 100 according to first embodiment.
Figure 2:
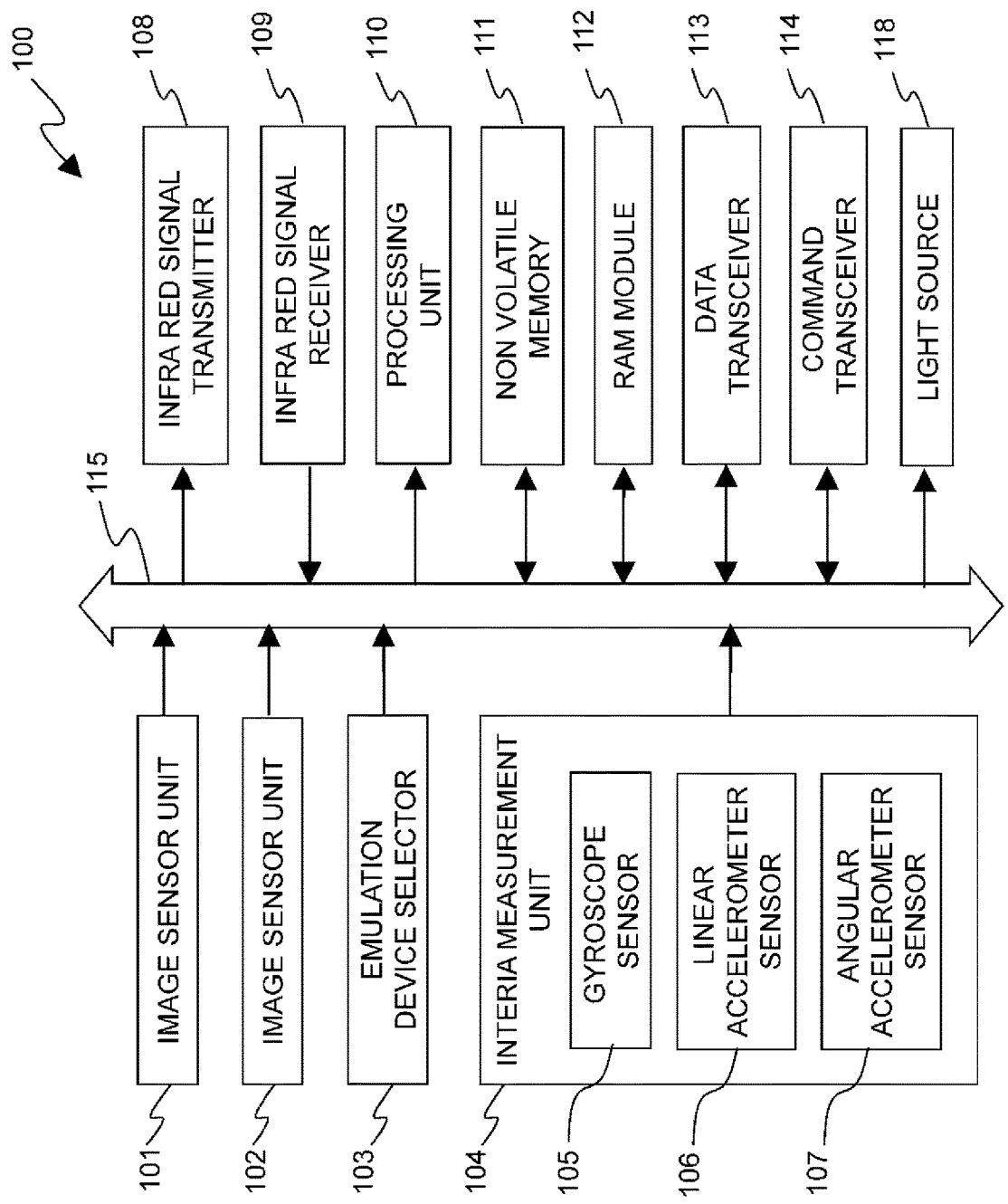
FIG. 2 shows an example block diagram of the wearable device 100.

An example structure of the wearable device 100 is shown in FIG. 1. A block diagram of the wearable device 100 showing its major components is shown in FIG. 2.

The wearable device 100 comprises at least two image sensors working in stereo configuration in order to be able to precisely determine relative location of the objects captured by the image sensors. The said image sensors capture images of the hand, and other objects in physical environment of the wearable device 100. In one data processing mode, the wearable device 100 processes the said images to determine location, relative to the wearable device 100, of at least one finger of the hand. In addition, the wearable device may also determine location and orientation, relative to the wrist, of at least one object in physical environment, in order to track the motion of wrist and to calculate the location of the said finger relative to the said object. Thus, the wearable device is able to track movements of the hand and the wrist in a 3 dimension space relative to a stationary point of reference.

The wearable device 100 also comprise an Inertia Measurement Unit (IMU hereinafter) to determine relative location, and orientation information of the wrist. This information supplements the wrist location and orientation information determined by image processing.

The wearable device 100 can communicate with at least one external computer device using either wired connection e.g. a wired Universal Serial Bus (USB hereinafter) connection, or using a wireless connection e.g. Bluetooth or Wi-Fi.

The wearable device 100 and the said external computer device can share the data processing, including but not limited to, image processing to determine relative location of fingers and nearby objects, gesture recognition, gesture matching, hand and wrist simulation, command generation for emulated data input device, etc. In this embodiment of the present invention, for example, the data processing is performed in 3 modes where in each mode the wearable device 100 and the external computer device perform different parts of all the data processing as required. The said three data processing modes are namely 'Command' mode, 'Location' mode and 'Raw Data' mode.

In the 'Raw Data' mode, the wearable device 100 sends the image data captured from the image sensors, and motion and orientation information received from the IMU, to the external computer device. The external computer device processes this data to determine hand gestures and may generate events to emulate a data input device, or may simulate user hand actions, or do some other task depending on the determined hand gesture.

In the 'Location' mode, the wearable device 100 processes the data received from sensors to determine relative locations of at least one finger, and the motion and orientation information of the wrist, and send this determined information to at least one external computer device. The external computer device may use this information to determine hand gestures and may generate events to emulate a data input device, or may simulate user hand actions, or do some other task depending on the determined hand gesture.

In the 'Command' mode, the wearable device 100 is able to emulate at least one data input device. The wearable device processes the data received from sensors to determine gesture of the hand and the wrist, and matches the determined hand gesture with a set of preregistered hand gestures. If a match is found, the wearable device 100 sends data that is registered for the matched gesture, to at least one external computer device.

Figure 7:
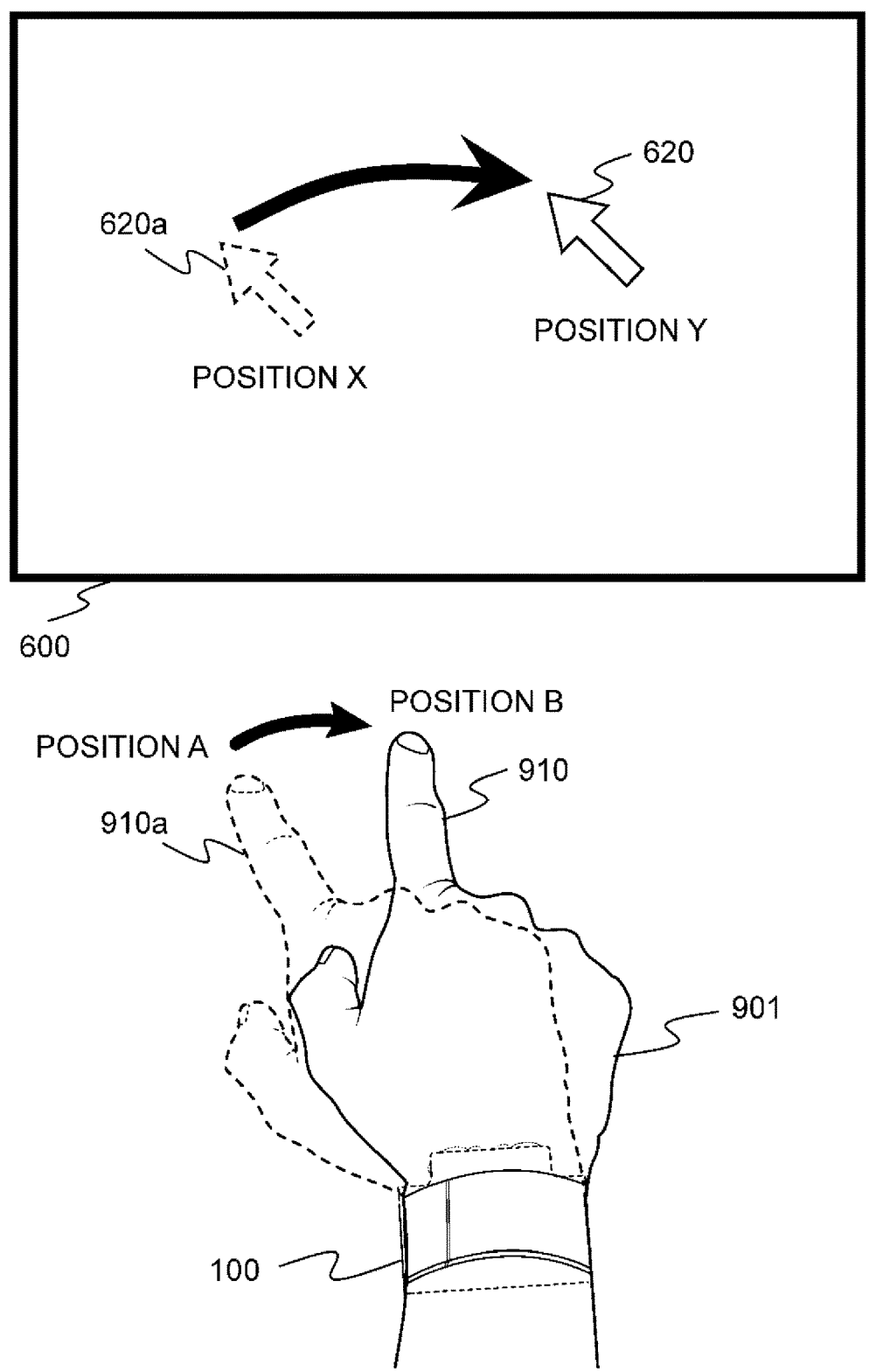
FIG. 7 illustrates a system where the wearable device 100 emulates a computer mouse.
Figure 10:
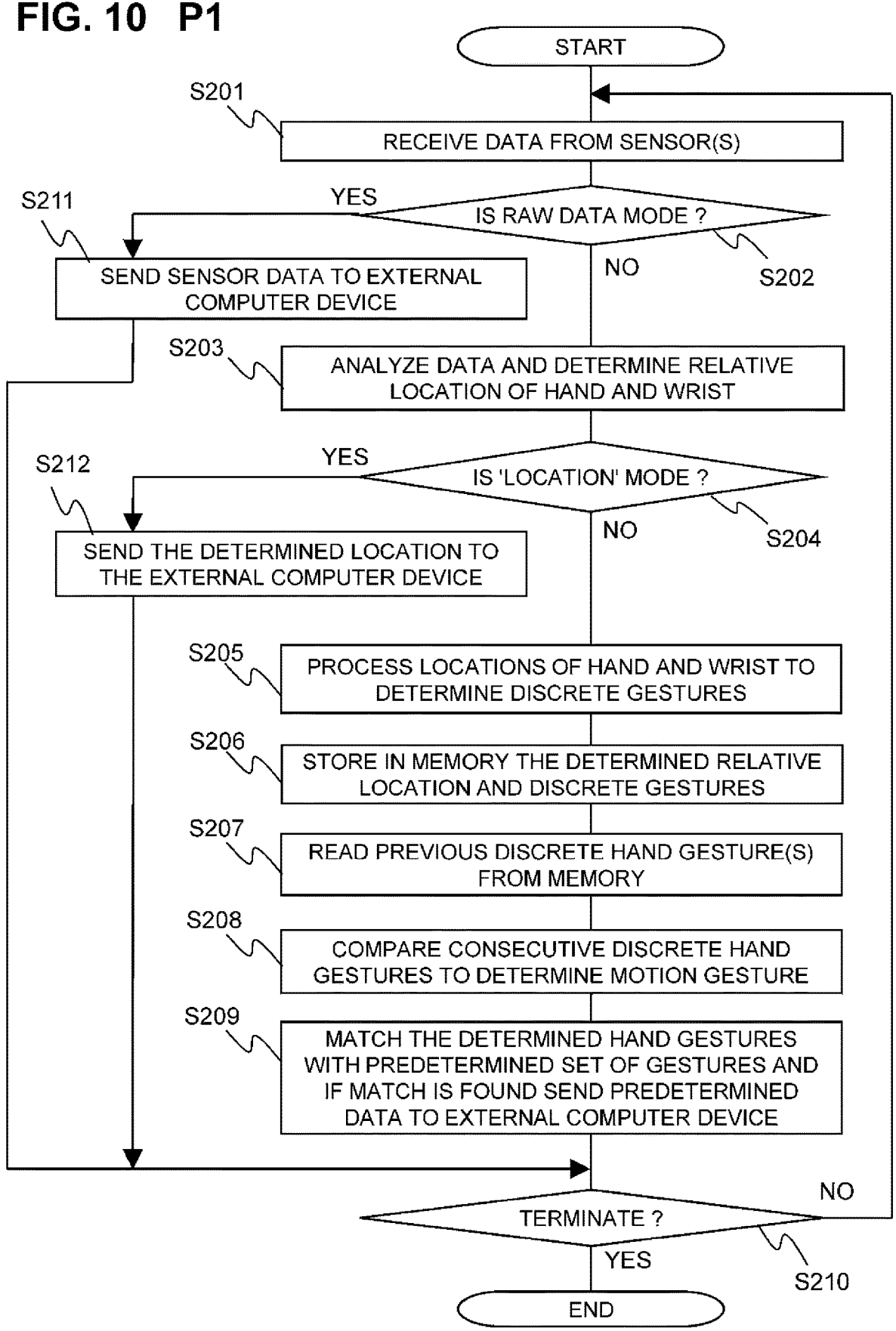
FIG. 10 is an example flowchart diagram of a program P1, executed by the wearable device 100, to determine hand gestures and to send relevant data to at least one external computer device.

Detailed working of the wearable device 100 in the said data processing modes is explained using FIG. 10 by a flowchart of a program running on the wearable device 100. FIG. 6, FIG. 7, and FIG. 8 explain example cases of using the wearable device as different kind of data input devices.

Figure 12:
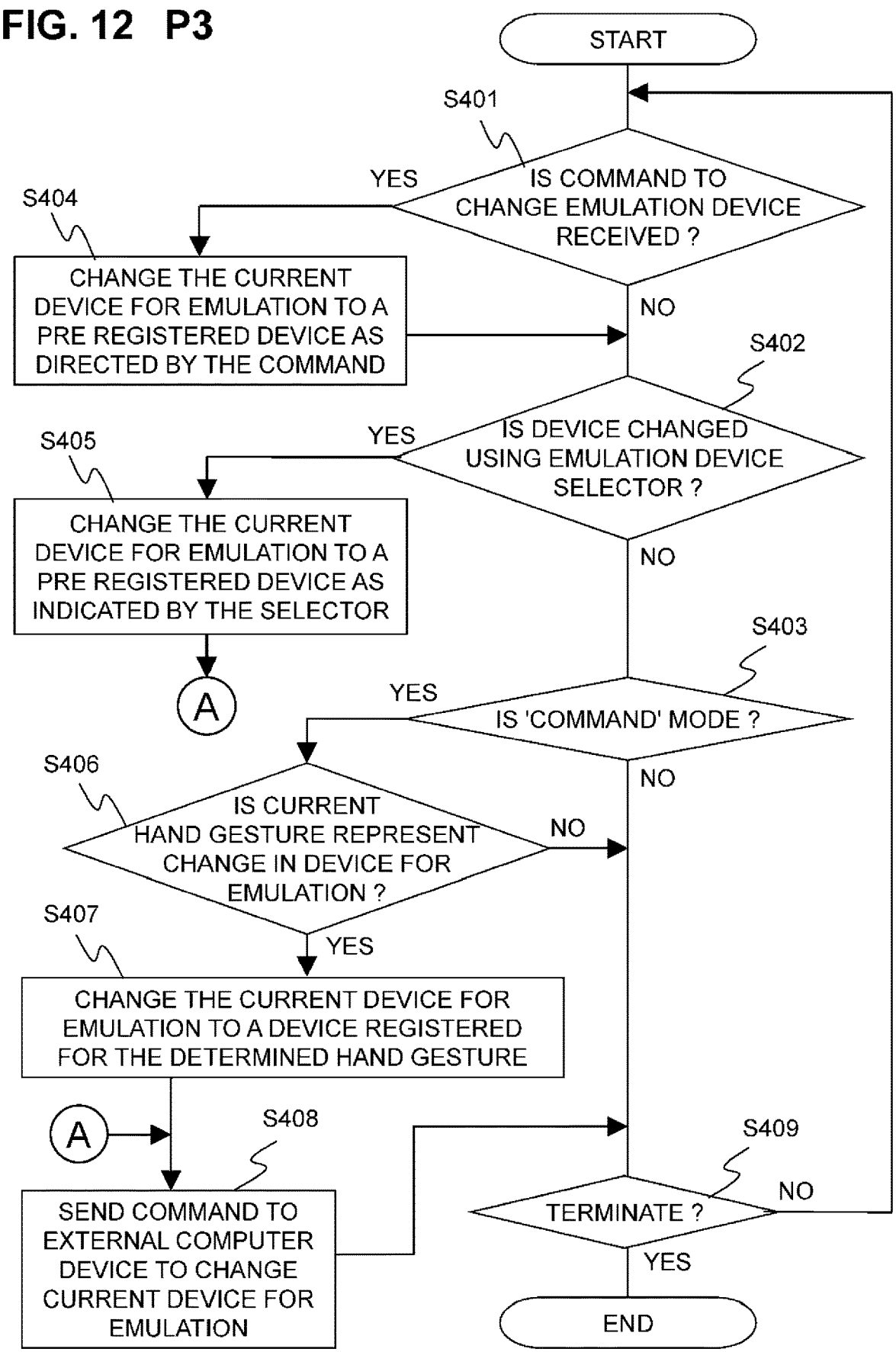
FIG. 12 is an example flowchart diagram of a program P3, executed by the wearable device 100, to change currently selected data input device for emulation.
Figure 13:
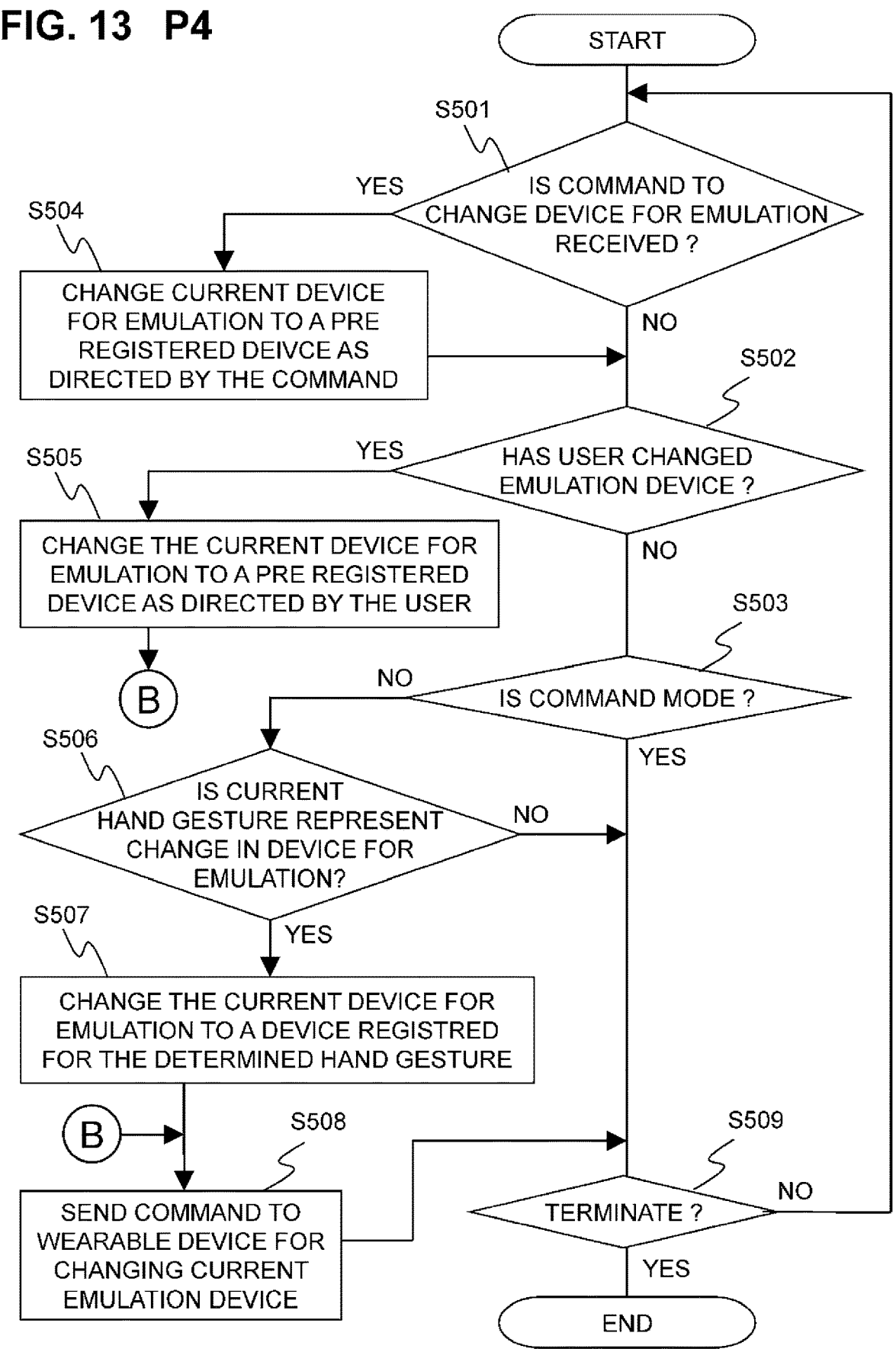
FIG. 13 is an example flowchart diagram of a program P4, executed by external computer device, to change currently selected data input device for emulation.

Multiple data input devices can be registered for emulation in the wearable device 100. The user can select a particular data input device for emulation in multiple ways such as by using an emulation device selector switch, or by making a preregistered hand gesture, or by sending a command to the wearable device 100 from an external computer device. FIG. 12 and FIG. 13 explain these method using flowcharts of programs to select a particular data input device for emulation.

The wearable device 100 also has at least one Infra Red signal transmitter and receiver unit that can be used to communicate with Infra Red signal compatible devices e.g. a television, air conditioner, DVD player, etc. The wearable device can also be used as a hand gesture based Infra Red remote control for the said electric or electronic devices. An example case of wearable device 100 emulating a remote control of a television is explained using FIG. 9.

FIG. 1 shows an example structure of the wearable device 100 according to this embodiment of the present invention. 101 and 102 are image sensors in stereo vision configuration. There can be more such image sensors. 103 is a selection switch that can be used to select a data input device for emulation. 120 and 121 are micro USB ports that can be used as one of the means for communication with external computer devices or at least one second wearable device 100. 108 is an Infra Red signal transmitter. 109 is an Infra Red signal receiver. 118 is a light source for example a white light LED used to provide illumination in case of lack of ambient light in the surroundings. 119 is a strap for wearing the wearable device 100 on wrist. Other electronic components of the wearable device such as processing unit, memory, power source, IMU, wireless data transceiver, etc. are mounted inside the housing 140 and are not shown in FIG. 1 for the sake of simplicity.

FIG. 2 is a block diagram depicting the wearable device 100 according to this embodiment of the present invention. The wearable device 100 comprises of at least one image sensor 101, a second image sensor 102 that can work in conjunction with the image sensor 101 as stereo image sensors, an emulation device selector switch 103, an Inertia Measurement Unit 104, at least one processing unit 110, at least one nonvolatile memory 111, at least one Random Access Memory module (RAM hereinafter) 112, at least one data transceiver unit 113, at least one command transceiver unit 114, at least one Infra Red signal transmitter 108, at least one Infra Red signal receiver 109, at least one light source 118 such as a white light LED.

The image sensor 101 can be a CCD image sensor, a CMOS image sensor, an Infra Red image sensor or some other image sensor or camera that can be used to measure distance of objects. The image sensor 101 has a wide angle image capture ability to be able to capture wide range of hand motion. The image sensor 102 can be similar to image sensor 101.

The two image sensors 101 and 102 can be used together as a stereo images capture unit in order to determine relatively more accurate location information of fingers and nearby objects as compared to the case when single image sensor is used. The wearable device 100 may comprise more such image sensors to further improve the precision of determined location of objects.

The emulation device selector switch 103 is one of the means to select a preregistered data input device for emulation using the wearable device 100. This selector switch 103 can be an electronic switch, an optical switch, or some other means to provide the ability to select a preregistered data input device for emulation.

There can be more such selector switches for to control functions of the wearable device 100, such as to select a data processing mode, to turn ON/OFF the light source 118, to select one of the data transceiver units 113 for transferring data, to select one of the external computer devices for communication, etc.

The Inertia Measurement Unit (IMU) 104 provides relative location, motion, and orientation information of user's wrist, to the processing unit 110. The IMU 104 may consists of a 3-axis Gyroscope Sensor 105 to provide orientation information of wrist, at least one 3-axis linear accelerometer sensor 106 to provide linear motion information of the wrist, and at least one 3-axis angular accelerometer sensor 107 to provide angular motion information of the wrist. The IMU 104 can process the output of the sensors 105, 106, and 107 to provide determined relative location, orientation, and motion information to the processing unit 110. Or the IMU 104 can provide raw information received from the sensors 105, 106 and 107 to the processing unit 110.

The processing unit 110 is a data processing unit such as a microprocessor, or a micro controller, or a General Purpose Graphics Processing Unit (GPGPU hereafter), or a Field Programmable Gate Array (FPGA hereafter), or an ASIC chip. There can be a plurality of processing unit 110 of different kinds that can collaborate and divide the task of data processing, transmission, and control, etc. The processing unit 110 receives data from the image sensors 101 and 102, the emulation device selector switch 103, the IMU 104, and the Infra Red signal receiver 109. The processing unit 110 also communicates with the nonvolatile memory 111, the RAM module 112, the data transceiver 113, and the command transceiver 114. The processing unit 110 executes at least programs P1 and P3. The processing unit 110 can also execute other relevant software applications, where the said software applications can either be preinstalled, or can be installed later for example through a storage media such as a USB flash memory, or through a wired or wireless network, using the data transceiver 113 or the command transceiver 114.

111 is a nonvolatile memory for example a NAND Flash memory. Operating system software and programs such as programs P1, P3 that are executed by the processing unit 110 can be stored in this memory. This memory can also store information that is required by programs for emulating a data input device, etc. This information may include 'Emulation Device Table 500', configuration information for data input device for emulation, information of external computer device, configuration and control information for wearable device 100 such as gesture information to change the current device for emulation to a different data input device, etc.

112 is a Random Access Memory (RAM) module such as DRAM, used by the processing unit 110 to temporary store information required for executing programs. For example, the memory 112 can be used to store images, current and previous location information and other configuration information of a data input devices currently being emulated by the wearable device 100, etc.

Data transceiver 113 is a wired or wireless data transmitter and receiver module to enable the wearable device to communicate with at least one external computer device, or with a computer network. For example, 113 can be a wired USB data transmitter and receiver, or a wireless Bluetooth or Wi-Fi data transmitter and receiver. There can be a plurality of data transceiver 113 so that the wearable device 100 can communicate with plurality of external computer devices and/or computer networks.

The command transceiver 114 is a wired or wireless data transmitter and receiver module. e.g. a wired USB data transmitter and receiver, or a wireless Bluetooth or WiFi data transmitter and receiver. Its primary role is to receive and send commands for controlling wearable device, especially if the data transceiver 113 is unable to communicate control related commands with the external computer device. For example, when the wearable device 100 is emulating a computer keyboard for a first external computer device, the data transceiver 113 may be used for communicating via standard computer keyboard protocol only. In this case, command transceiver 114 can be used to communicate with either the first external computer device or a second external computer device for sending and receiving control related commands for wearable device 100. The control commands can be for example, to select a particular data input device for emulation, or to change the data processing mode, etc. The command transceiver 114 can also be used to communicate with other wearable devices 100, or can be used as an alternative or in cooperation with the data transceiver 113. For example, when the user wears the wearable devices 100 on both its wrists, the two wearable devices can communicate with each other using their command transceiver 114.

115 is internal network for transferring data and command, to and from various elements of the device 100.

The Infra Red signal transmitter 108 and receiver 109, are used to communicate with devices that are capable of receiving and/or transmitting Infra Red signals. 108, 109 are specially used when emulating an Infra Red signal type remote control unit. For example, when the wearable device emulates remote control of a television, the Infra Red signal transmitter 108 is used to send remote control commands to the television's Infra Red signal receiver unit.

FIG. 3 shows an example of hand and object tracking; and determination of relative location of fingers, wrist, and nearby objects, by the wearable device 100. FIG. 3 shows a wrist of a user wearing the wearable device 100. 850 is a flat surface such as a table. 851 is a stationary object that is computer recognizable, such as a geometrical pattern or a fiducial marker, etc. Object 851 can be preregistered in wearable device 100 for easier detection. Or the object 851 can be any other stationary object that is not preregistered in the wearable device 100, but can be distinguished against a uniform background such as a colorful teapot on a white table.

The image sensors 101 and 102 face towards inner side of the hand and capture images which include the hand and the object 851. By analyzing the stereo images, the wearable device 100 is able to determine location of fingertip 911, DIP 912, PIP 913, and the location of object 851, relative to the wearable device 100 (and the wrist 920). In this example, only the location of index finger is shown for simplicity. Location of other fingers can also be determined in similar way. The image processing can use any well known pattern recognition methods to detect elements and their location. For example, edge detection technique can be used to extract fingertip, and the difference in skin texture at DIP and PIP joints of a finger can be used to extract the location of the DIP and the PIP joint. The said difference in skin texture at finger joints is the line texture that is found at the inner side of the finger, and is perpendicular to the finger, and in general has a different skin color than the rest of the finger.

FIG. 3 also shows a skeleton structure of the index finger 910, the object 851, and the determined locations of various elements. L11 is location of the fingertip 911 of the index finger relative to the wrist 920, and L21 is location of the object 851 relative to the wrist 920. With this information, location L31 of the fingertip 911 relative to the object 851 can be easily calculated, for example, by shifting the origin of coordinate system from the wrist 920 to the determined location of object 851. Similarly, location of the DIP 912, the PIP 913 of index finger, and location of other fingers of the hand can also be determined. Thus, even if the wrist moves, location of hand, and the wrist can be tracked relative to the object 851.

FIG. 4 shows an example of hand tracking and gesture recognition by the wearable device 100, in a case when the hand 901 moves with respect to the wrist, but the position of fingers remain stationary with respect to the palm. In this example, the palm move from an initial position A on the left to a final position B on the right, while the wrist is stationary and parallel to the horizontal plane. The figure shows a perspective view of the hand 901.

The wearable device 100 is connected to an external computer device 150 using, for example, wireless Bluetooth connection. The computer 150 has an 'Emulation Device Configuration Table' 500b that is similar to the table 500, and it can execute program P2 and P4. The computer 150 can be a general purpose desktop computer, a laptop computer, a tablet computer, a smart phone, a gaming console, a wearable computer, or other computer devices that are able to communicate with wearable device 100 and are able to run at least program P2 and P4. The computer 150 may use a display unit 600 for example to show simulation of the hand or the output of a command received from the wearable device 100.

Image sensors 101, 102 of the wearable device 100 continuously capture images of hand at a predetermined time interval, and the wearable device 100 processes the said images to determine location of all the fingers relative to the wrist. Using the location information of the hand, the wearable device determines discrete gesture of the hand at the initial position A, i.e. the index finger 910a is opened up straight, the thumb is pointing in the direction of index finger 910a, and all other fingers are curled back. Using the motion and orientation information from the IMU 104, the wearable device 100 also determines that the wrist is stationary and parallel to the horizontal plane. Wearable device 100 can also determine location of the wrist relative to a stationary object in physical environment, but it is not explained in this example for the sake of simplicity.

The wearable device 100 keeps determining discrete gesture of hand for each set of images as the hand moves from position A to B. In this example the data processing mode is 'Command' mode, and the wearable device 100 compares the at least two determined discrete gestures of hand to determine the motion gesture of the hand, i.e. the index finger 910 pointing forward and moving from position A to B. The wearable device 100 then refers to table 500 and reads the data associated with the determined gesture and registered for the data input device currently being emulated, and sends this data to the computer 150. The said data can be command(s) generated by a data input device.

For example, if the wearable device 100 is emulating a computer mouse, the wearable device 100 will send command(s) similar to the commands sent by a computer mouse when the mouse is moved from position A to B. In another example, if the wearable device 100 is emulating a slide show controller, and the determined index finger swapping motion gesture is registered as a gesture for moving to the next slide, wearable device 100 send command(s) for moving to the next slide, where the said command is similar to that generated by the slide show controlling device for moving to the next slide.

FIG. 5 shows an example of 'Emulation Device Configuration Table' 500, used to store configuration information of data input device for emulation. This table can be stored in memory 111 and can be used by programs for example P1 or P3, to match the determined gestures with the registered gestures and to get data associated with matched gesture, etc.

The external computer device also has 'Emulation Device Configuration Table' 500b, similar to table 500, and can be used by program P2 and P4.

The column 510, stores a list of all the registered data input devices. Each data input device is listed in sub column 512, under its relevant category registered in sub column 511. The sub column 511 stores category such as 'Computer Keyboard', 'Computer Mouse', etc. The sub column 512 can store well known, as well as user defined custom data input devices.

Column 520 stores hand gestures registered for each data input device, that can trigger events or that are associated with some data for sending to external computer device 150. Column 520 can manage the gestures for example with three sub columns 521, 522, and 523. Sub column 521 stores list of finger(s) that make up a hand gesture. For example, when emulating a computer mouse a tapping action by index finger can be registered as a gesture and column 521 stores index finger. When emulating a computer keyboard only a key press action at a given location is relevant, so column 521 may store 'Any Finger'. Sub column 522 stores registered discrete hand gestures. Sub column 523 stores registered motion hand gestures.

Column 530 stores wrist gestures registered for each data input device, that can trigger events or that are associated with some data for sending to external computer device 150. Column 530 can manage the gestures for example with two sub columns 531 and 532. Sub column 531 stores registered discrete wrist gestures. Sub column 532 stores registered motion wrist gestures.

Column 520 and 530 can be used together for a combined gesture of hand and wrist.

Column 540 registers location(s) relevant to the gesture such as, location of finger when doing key press gesture, etc. Column 540 can manage the locations for example with two sub columns 541 and 542. Sub column 541 stores location of finger(s). This location can be relative to wrist or relative to a determined stationary object. Sub column 542 stores location of wrist. This location can be relative to an initial wrist location or relative to a determined stationary object.

The table 500 can also store a range of locations (instead of one fix location) or data for probabilistic models to improve gesture matching.

Column 550 stores data associated with each set of the registered gestures and location(s) for each data input device. For example, when emulating a computer keyboard, a hand gesture of key press at a particular location can be registered in column 550 as key press on key "Q" along with relevant computer keyboard command.

Similarly, a table that stores wearable device control function related information may also exist and can be used for example by program P3 for selecting device for emulation.

The wearable device 100 and the computer device 150 have means to register user defined data input device and its configuration information, in the table 500.

FIG. 6 shows an example when the wearable device 100 is used to simulate hands and to operate a simulated virtual English QWERTY computer keyboard. In this example, user wears the wearable device 100 on both of his wrists. FIG. 6 shows the wearable device 100a and 100b wore on wrists of right hand 901 and left hand 902 respectively of a user. In this example, both the wearable devices 100a and 100b communicate with the external computer device 150 which is a general purpose desktop computer (computer 150 is not shown in FIG. 6 for the sake of simplicity). The computer 150 uses a display screen 600 to display a simulated graphical layout of the said keyboard 611 and a simulated graphical outline representation of user's hands 601 and 602 overlaid on the simulated keyboard 611. 615 is a Window of a Text Editor software such as Microsoft Notepad. 616 is the text that user inputs by operating the virtual keyboard 611 with the help of wearable devices 100a, 100b.

In this example the data processing mode of both the wearable device 100a and 100b is 'Location' mode, so the wearable device 100a, 100b provide relative location and motion information of the respective hands and the wrists to the computer 150. The external computer 150 uses this location information to simulate motion of the user's hands by moving the graphical hands 601 and 602 over the keyboard 611. The computer 150 also processes the said location information to determine discrete and motion gestures of both the hands 901 and 902. The computer 150 then refers to a table similar to the table 500b, and matches the determined gestures with a predetermined set of gestures registered for emulating the keyboard, and reads the associated data (command) that emulates commands of the said keyboard.

For example, at a certain point in time, if the index finger of right hand 601 is positioned above the alphabet key 'U' of the keyboard 611, and the user does a key press action with its index finger of right hand 901, the computer 150 determines the keystroke action, and treats it as a keystroke on alphabet key 'U', and reads the relevant keyboard command from the table 500b to simulate the key press of alphabet 'U'. In this example this command is used internally by the computer 150 for inputting the text 616 in the text editor 615.

With this method of computer keyboard simulation, user does not have to remember the layout of the keyboard to perform a particular key press action. By moving his hands 901 and 902, user is able to move and align the hands 601 and 602 above the key that user wants to press, and simply doing the key press action at that location will result in input of the said key.

FIG. 7 shows an example of the wearable device 100 emulating a computer mouse. The external computer device 150 in this example is a general purpose computer (computer 150 is not shown in FIG. 7 for the sake of simplicity), and 600 is a display screen of the computer 150. The wearable device 100 is connected to the said computer using a wireless Bluetooth connection and the computer 150 recognizes the wearable device 100 as a computer mouse. In this example, the data processing mode is 'Command' mode. 620 is Pointer of the computer mouse at a final position Y, and 620a is the same mouse pointer at an initial position X.

User first selects computer mouse as the data input device for emulation. Similar to the example of FIG. 4, in this example also the user moves his hand with the index finger 910 doing a swapping action i.e. moving from initial position A on left to position B on right. As explained earlier with the help of FIG. 4, the wearable device 100 tracks this hand movement and determines discrete and motion gestures of the hand. The wearable device 100 then refers to the table 500 and determines that when emulating a computer mouse, the determined swapping hand gesture matches with, for example, proportionate mouse movement in the same direction. The wearable device 100 reads the data (commands) registered for moving the mouse in determined direction and send it to the external computer device 150.

Upon receiving these commands from the wearable device 100, the computer 150 moves the mouse pointer 620 on the screen 600 from position X to Y, where the movement from Position X to Y is in proportion and in the same direction, as that of the movement of finger 910 from position A to B.

If the user does a tapping gesture with its index finger 910, the wearable device 100 determines this tapping gesture, and on referring the table 500 finds out that this gesture is registered as, for example, left button click of the said computer mouse. The wearable device 100 then sends command for left button click to the computer 150.

Right button click, wheel scroll, etc. functions of the said computer mouse can also be emulated similarly by making different preregistered hand gestures.

FIG. 8 shows an example of the wearable device 100 used as a hand gesture based video game controller. In this example, the external computer device 150 is a video game console (computer 150 is not shown in FIG. 8 for the sake of simplicity), and the wearable device 100 communicates with the gaming console 150 using a Wi-Fi connection. 600 is a display screen that shows game graphics generated by the game console 150.

In this example, the video game is about shooting a handheld gun 630 on a target 631 that moves up and down randomly on the screen. 601 is a graphical representation of user's right hand. 610 is graphical representation of index finger of the hand 601.

In this example, the data processing mode is 'Location' mode. The gaming console 150 executes program P2 to determine hand gesture using the location information received from the wearable device 100, and converts the gestures into useful commands for playing the said game. In this example, the determined hand gestures are used to move/tilt the hand 601 up and down, and for pulling the trigger of the gun 630.

When user moves his wrist up and down, or tilts his hand in order to aim the gun 630 in the direction of the target 631, the wearable device 100 tracks this wrist and hand motion. By processing the images received from image sensors 101 and 102, and inertia information from IMU 104, the wearable device 100 determines the relative location and orientation of the hand and the wrist, and sends this information to the gaming console 150. The gaming console 150 processes the received information to determine hand and wrist gestures, and moves the hand 601 such that it follows the movements of user's hand 901.

When the user does a trigger pulling action from his index finger 910, upon receiving finger location information from the wearable device 100 the gaming console 150 determines this gesture. The gaming console 150 then refers to the table 500b and determines that the said gesture is registered for pulling the trigger of the gun 630. The gaming console then updates the gaming graphics for a trigger pulling action and simulates shooting of the gun 630. In this way, user can play the said game using wearable device 100 as the game controller.

In this example, since the wearable device 100 sends location and orientation information of hand and wrist, the gaming console can interpret a particular gesture to trigger different actions for different games. With this method, the wearable device 100 do not need to update its program or the registered data, etc. for determining various gestures and commands that are specific to each game.

FIG. 9 shows an example when the wearable device 100 emulates remote control for a television 800. User first selects television remote control as the data input device for emulation, and points the Infra Red signal transmitter 108 to the Infra Red signal detector unit 801 of the television 800. User then makes a gesture to control the functioning of the television 800. The wearable device 100 determines this gesture and sends relevant command to the television 800 using the Infra Red signal transmitter 108.

In this example, similar to the example shown in FIG. 4, the user makes a swapping gesture by moving his index finger from position A to B. The wearable device 100 first determines discrete hand gesture when the hand is at position A, and then refers the table 500 to find out that the determined discrete hand gesture is registered, for example, to select volume control of the television 800.

The wearable device 100 then determines motion hand gesture of swapping from position A to B by index finger, and again refers to the table 500 to determine that the said motion gesture is registered as increasing the selected control. In this example the selected control is volume control, so the wearable device 100 reads data (command) registered for increasing volume in proportion to the determined displacement of index finger, and transmits the said data (command) through the Infra Red signal transmitter unit 108.

The Infra Red signal detection unit 801 of television 800 receives the said data (command) and the television 800 increases volume by the amount as indicated by the received data (command). Similarly other functions of television 800 can also be controlled by making relevant registered gestures.

The wearable device 100 can work as a hand gesture type universal remote control for various Infra Red signal controlled devices, such as Air-Conditioner, DVD Player, Music System, Projector, etc.

FIG. 10 is a flowchart diagram depicting the program P1 executed by processing unit 110. The program P1 processes images received from image sensors 101 and 102, and inertia information from IMU 104, and sends at least one of the following three information to the external computer 150 according to data processing modes.

(1) Image data received from image sensors 101 and 102, and inertia information received from IMU 104.

(2) Relative location and orientation information of hand and wrist.

(3) Data similar to the data generated by a data input device which the wearable device 100 is emulating.

In step S201, the program receives data from sensors, for example images from image sensor 101 and 102, and inertia information of wrist from IMU 104.

In step S202 the program checks whether the current data processing mode is 'Raw Data' mode or not. If true, the program executes step S211, otherwise the program executes step S203.

In step S203, the program analyzes sensor data received in step S201 to determine relative location and orientation of the hand and the wrist. By processing the images, the program can determine location of the hand relative to the wrist and relative to at least one stationary object, and location of wrist relative to the said stationary object. By processing the inertia information, the program determines location of the wrist relative to an initial position of the wrist. The locations of the wrist determined by image analysis and by inertia data can be used together to improve the precision of determined location of the wrist. The said image analysis can be performed using any well known pattern and location recognition methods, for example that make use techniques such as edge detection, corner detection (e.g. Forstner Algorithm), etc.

In step S204, the program checks whether the current data processing mode is 'Location' mode or not. If true, the program executes step S212, otherwise (for 'Command' mode) the program executes step S205.

In step S205, the program processes the relative location information of the hand and the wrist to determine a combined discrete gesture of hand and wrist.

In step S206, the program stores in RAM 112, the relative location and orientation information determined in step S203 and the discrete gestures determined in step S205.

In step S207, the program reads from the RAM 112, previous relative location and orientation information of the hand and the wrist, and previous discrete gestures, for processing in step S208.

In step S208, the program compares current and previous hand gestures, and determines motion gestures of the hand and the wrist. Program can also store this determined motion gesture in RAM 112 for later reference.

In step S209, the program refers to the table 500 and compares the determined discrete and motion hand gestures with a set of discrete and motion hand gestures that are preregistered for a data input device selected for emulation. If a match is found, data registered for the matched gesture is sent to at least one external computer device 150 using the at least one data transceiver 113, or the said data is transmitted through the Infra Red signal transmitter 108.

In step S210, the program checks for condition to terminate. If the condition is met, for example if the user made a gesture for ending the program, the program ends. Otherwise the program loops back to step S201.

In step S211, the program sends the image data from the at least one image sensor unit 101 and the inertia data of the wrist, received in step S201, to the at least one external computer device 150 using the at least one data transceiver 113.

In step S212, the program sends the relative location information of the hand and the wrist, determined in step S203, to the at least one external computer device 150 using the at least one data transceiver 113.

Figure 11:
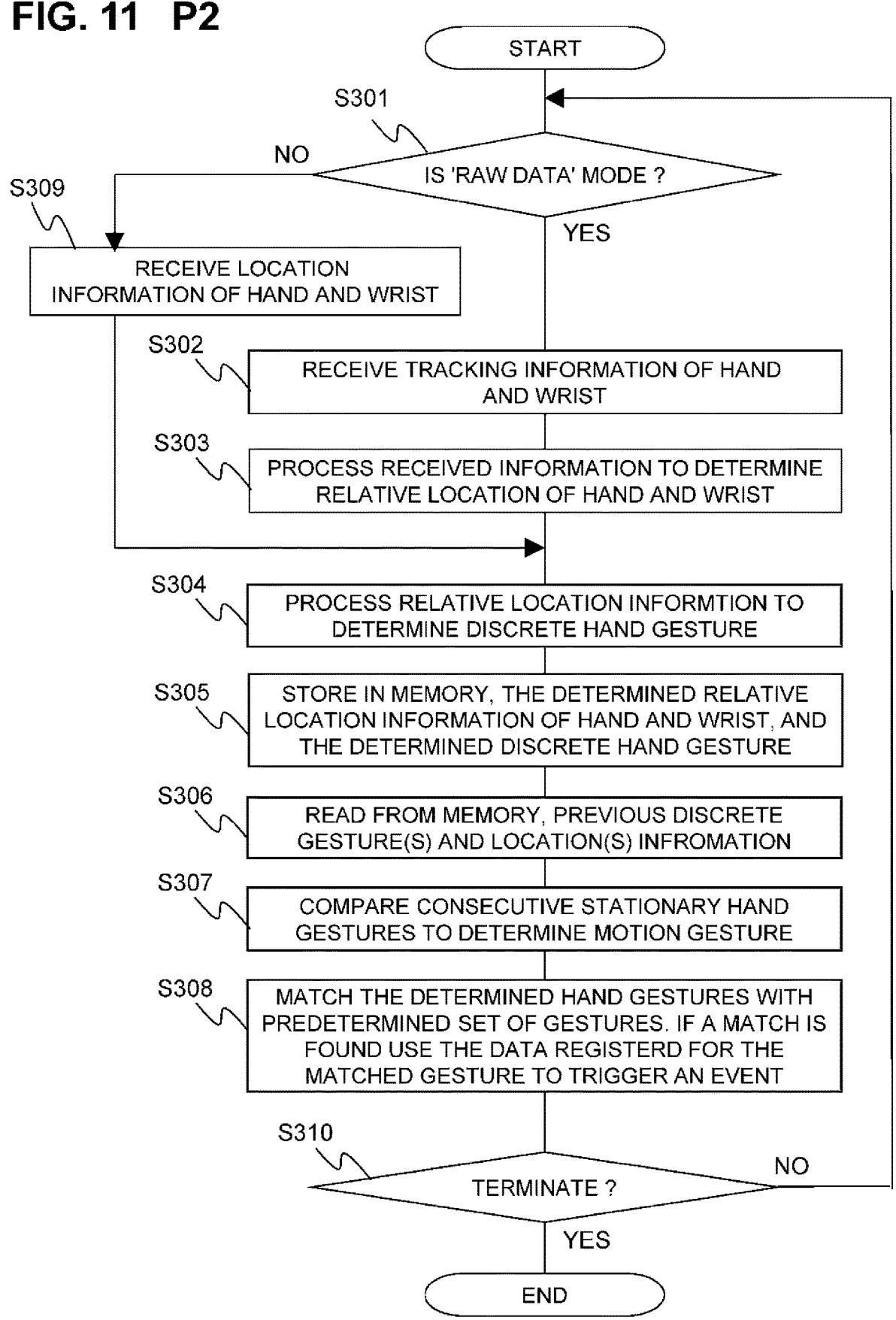
FIG. 11 is an example flowchart diagram of a program P2, executed by external computer device to determine hand gestures using information received from the at least one wearable device 100, and to take actions relevant to the determined gestures.

FIG. 11 is a flowchart diagram depicting the program P2 executed by the external computer device 150. The program P2 is executed only when the data processing mode is either 'Raw Data' mode or 'Location' mode. The program P2 receives hand and wrist tracking information from the at least one wearable device 100, and processes the received information to determine discrete and motion hand and wrist gestures. The said gestures can also be combined gestures of both hands of user when the program receives information from wearable devices 100 wore on both the wrists of the user.

According to the determined discrete and motion gestures, the program either triggers some software event or sends a predetermined data associated with the determined gesture to a second program. The said second program may be executed by the said external computer device 150 (the first external computer device) or may be executed by a second external computer device 150b that can take input from the said first external computer device 150.

In step S301, the program checks whether the current data processing mode is 'Raw Data' mode or not. If true, the program executes step S302, otherwise (for 'Location' mode) the program executes step S309.

In step S302, the program receives tracking information of the hand and the wrist, such as images and inertia information from the at least one wearable device 100.

In step S303, the program processes the tracking information received in step S302 to determine relative location and orientation of the hand and the wrist, in similar manner as explained in step S203 of program P1.

In step S304, the program processes the relative location information of the hand and the wrist to determine discrete gesture of the hand and the wrist. The said location information can either be received in step S309 or determined in step S303.

In step S305, the program stores in RAM 112, relative location information of the hand and the wrist, and the discrete gestures. This said relative location information is either received in step S309 or determined in step S303. The said gestures are determined in step S304.

In step S306, the program reads previous discrete gestures and previous relative location information of the hand.

In step S307, the program compares current and previous gestures to determine motion gesture of the hand and the wrist.

In step S308, the program refers to the table 500b and compares the determined discrete and motion hand gestures with a set of discrete and motion hand gestures that are preregistered for a data input device selected for emulation. If a match is found, the data registered for the matched gesture is used to trigger some software event or to provide input to a second program.

In step S309, the program receives relative location information of the hand and the wrist from the at least one wearable device 100.

In step S310, the program checks for condition to terminate. If the condition is met, for example if the user made a gesture for ending the program, the program ends. Otherwise the program loops back to step S301.

FIG. 12 is a flowchart depicting the program P3 executed by the processing unit 110 for changing the data input device selected for emulation, and to keep the current selection of data input device for emulation, in sync with the external computer device 150.

In step S401, the program checks whether a command, to change the current data input device for emulation, has been received or not. If such command has been received, the program executes step S404, otherwise the program executes step S402.

In step S402, the program checks if the selection on emulation device selector 103 has changed or not. If the selection has changed, the program executes step S405 otherwise the program executes step S403.

In step S403, the program checks whether the current data processing mode is 'Command' mode or not. If true, the program executes step S406 otherwise the program executes step S409.

In step S404, the program changes the current data input device for emulation, to a data input device as directed by the command received in step S401. The said command may either direct the wearable device 100 to set a preregistered device as the current data input device for emulation, or the said command may itself contain information about a new data input device for emulation so that the wearable device first registers the said new data input device in table 500 and selects it for emulation. The said information about new data input device may contain a data set of relative locations and gestures of hand and wrist, and associated data to be used when the user makes those gestures.

In step S405, the program changes the current device for emulation, to a preregistered data input device as indicated by the emulation device selector 103.

In step S406, the program checks whether the gesture determined in step S208 of program P1 represent a change in current data input device for emulation, by matching the said determined gesture with a set of gestures that are preregistered for controlling the functions of wearable device 100. If a match is found, the program executes step S407 otherwise the program executes step S409.

In step S407, the program changes the current data input device for emulation to a data input device preregistered for the determined gesture.

In step S408, the program sends command to the external computer device 150, about changing the current data input device for emulation.

In step S409 the program checks for condition to terminate. If the condition is met, for example if the user made a gesture for ending the program, the program ends. Otherwise the program loops back to step S401.

FIG. 13 is a flowchart diagram depicting the program P4 executed by external computer device 150 to change the current data input device selected for emulation and to keep the currently selected device for emulation in sync with the wearable device 100.

In step S501, the program checks whether a command to change the current device for emulation has been received or not from the wearable device 100. If such command has been received, the program executes step S504, otherwise the program executes step S502.

In step S502, the program checks whether a user of external computer device 150 has selected a different device for emulation or not. If true, the program executes step S505, otherwise the program executes step S503.

In step S503, the program checks whether the data processing mode is 'Command' mode or not. If true, the program executes step S509 otherwise the program executes step S506.

In step S504, the program changes the current device for emulation to a preregistered data input device as directed by the command received from wearable device 100 in step S501.

In step S505, the program changes the current device for emulation to a preregistered data input device as directed by the user in step S502. The user may provide information about a new data input device for emulation, so that the program first registers the said new device, for example in table 500b, and selects it as current device for emulation. The said information about the new data input device may contain a data set of locations and gestures of hand and wrist, and associated data to be used when a user of wearable device 100 makes those hand gestures.

In step S506, the program checks whether the hand gesture determined in step S304 or S307 of the program P2 represents a change of device for emulation or not. If true, the program executes step S507, otherwise the program executes step S509.

In step S507, the program changes the current device for emulation to a preregistered data input device as indicated by the said determined gesture.

In step S508, the program sends command to the wearable device 100 for changing the current device for emulation to the device selected for emulation in step S505 or step S507. If, in step S505, the user has provided a new data input device for emulation, the said command may include the information about the new data input device for emulation as provided in step S505.

In step S509, the program checks for condition to terminate. If the condition is met, for example if the user made a gesture for ending the program, the program ends. Otherwise the program loops back to step S501.

Example 2

This embodiment of the present invention describes a wrist wearable device 200 that is similar to the wearable device 100 according to first embodiment, but has additional secondary sets of image sensors to capture images of objects in physical environment, situated at various angles from user's wrist. The wearable device processes images from the said additional set of image sensors to determine location of the wrist relative to the said objects. Using additional set of image sensors improves the possibility of determining at least one stationary object in physical environment, that is recognizable by image processing and can be used as a reference point for determining location of the wrist. Specially if the image sensors 101 and 102 are unable to recognize objects in front of the wrist either because the recognizable object falls behind the hand and is not visible in the images captured by the image sensors 101 and 102, or if there is no recognizable object present in front of the wrist.

The said additional secondary sets of image sensors of the wearable device 200, wore on one wrist of a user, can also capture images of other arm, hand, and wrist of the user so that the wearable device 200 can determine the distance between the two wrists, specially in the case when an object for reference can not be determined by the wearable device 200. The said additional secondary sets of image sensors may be situated at different angles on the strap 119 of the wearable device 200. One set of the secondary image sensors can be a pair of image sensors in stereo configuration to precisely determine the relative location of captured objects. Other features, functions and programs of the wearable device 200 according to this embodiment of the present invention are the same as explained for wearable device 100 in the first embodiment.

Figure 14:
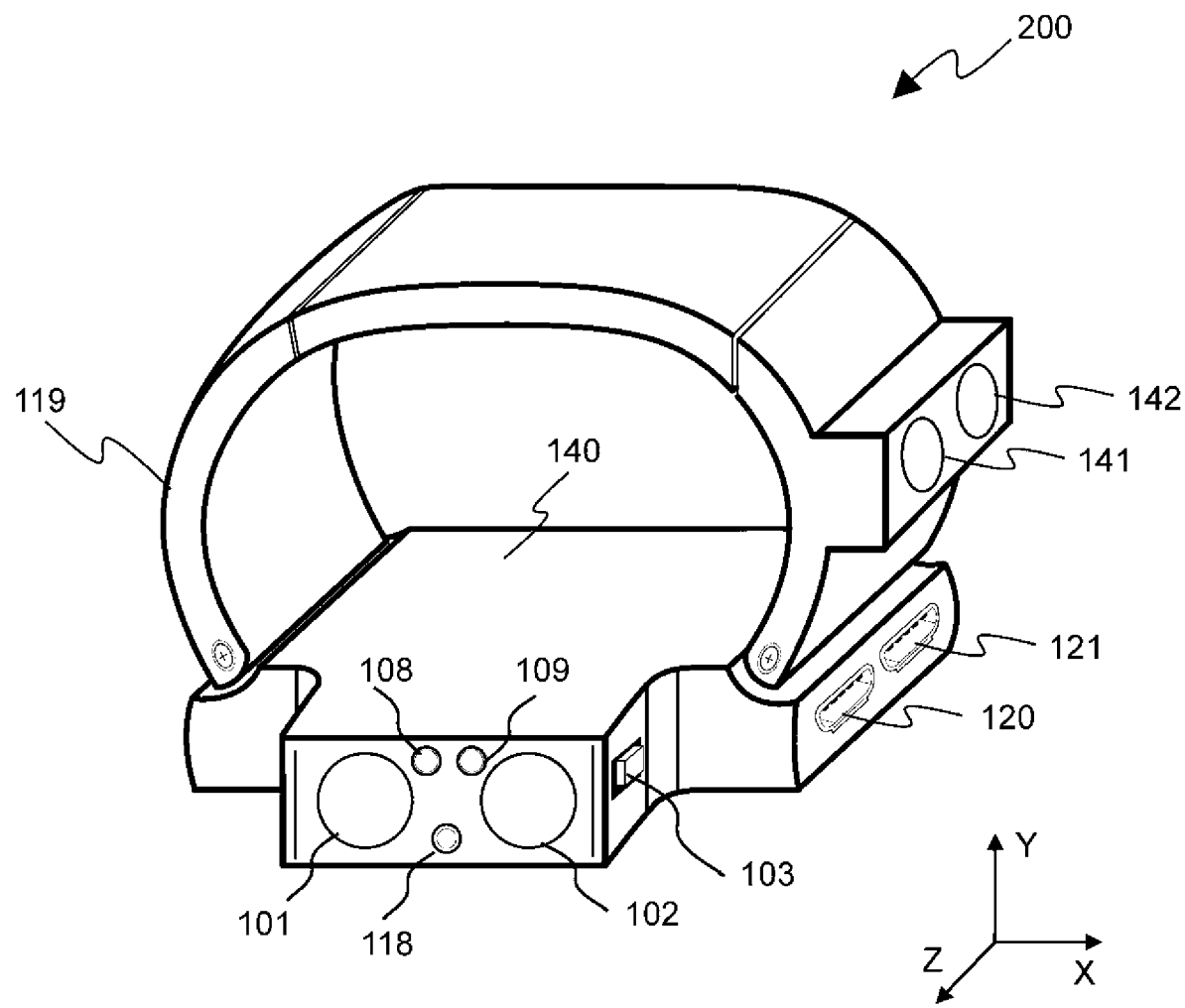
FIG. 14 illustrates an example structure of wearable device 200 according to second embodiment of the present invention.

FIG. 14 shows an example of wearable device 200 according to this embodiment of the present invention. 141 and 142 are secondary stereo image sensors facing the X axis. The image sensors 141 and 142 can be similar to image sensors 101 and 102. There can be more such secondary image sensors facing different axis.

Figure 15:
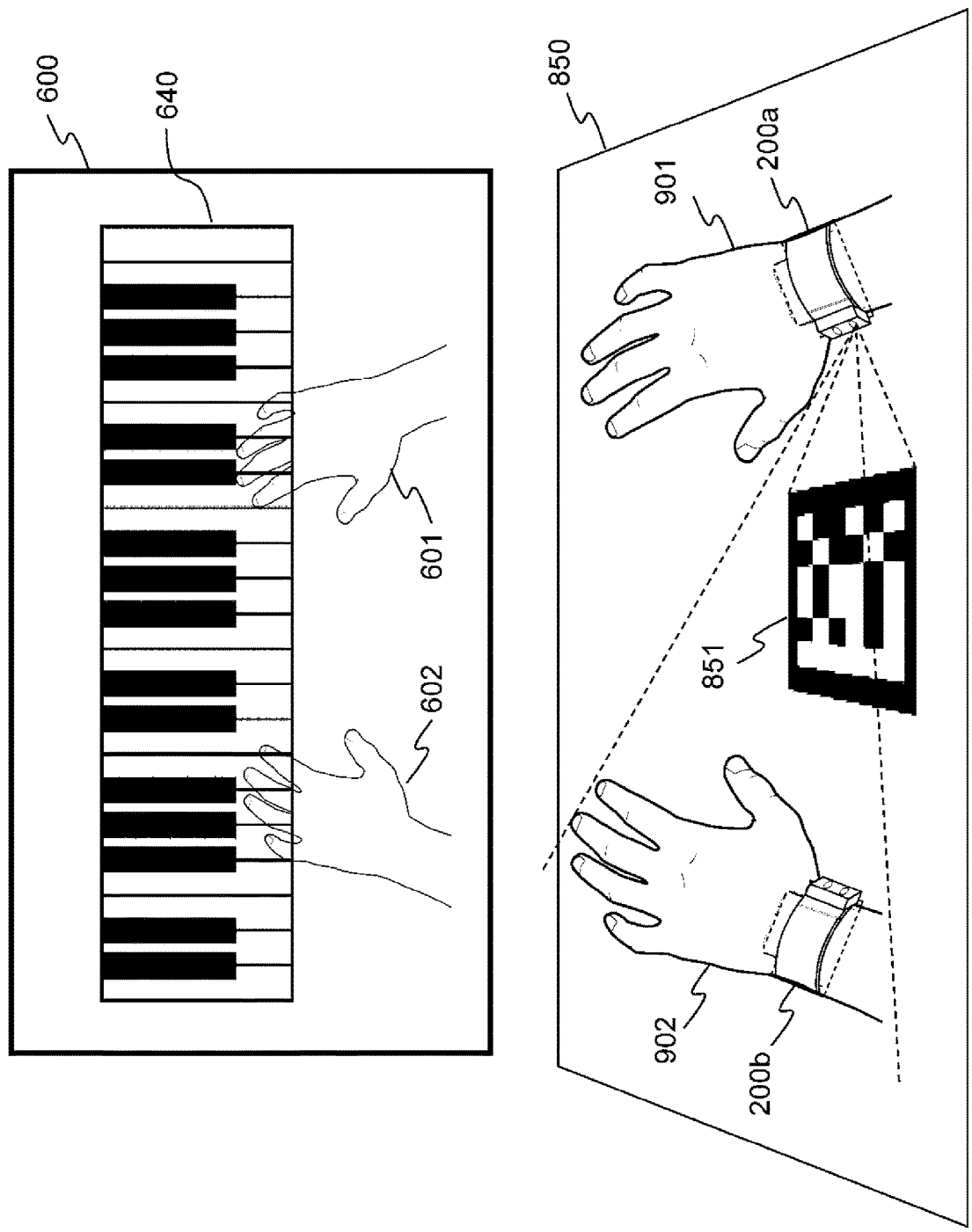
FIG. 15 illustrates a system where the wearable device 200 is used to simulate piano and motion of both the hands of a user.

FIG. 15 shows an example case when the wearable device 200 according to second embodiment is used to simulate both hands of a user, playing a simulated musical instrument piano. 901 and 902 are right and left hands respectively of the user. The user wears the wearable devices 200a and 200b on his right and left wrist respectively, such that the secondary image sensors 141a and 142a on device 200a face towards left hand, and the secondary image sensors 141b and 142b on device 200b face towards the right arm. 850 is a flat surface such as a table. 851 is a computer recognizable object, for example a printed image of a geometrical pattern, laid on the table 850. The object 851 is situated on the table 850 in a manner so that the secondary image sensors of both the devices 200a and 200b are able to capture the object 851. Both the wearable devices 200a and 200b are connected to an external computer device 150 (computer 150 is not shown in FIG. 15 for the sake of simplicity) using wireless Bluetooth connection. In this example the computer 150 is a general purpose desktop computer and 600 is a display screen of the computer 150. 640 is a simulated graphical layout of a piano. 601 and 602 are simulated graphical outline representation of the two hands of the user.

In this example the data processing mode is 'Location' mode and the devices 200a and 200b send determined relative location information of the respective hands and the wrists to the computer 150. The computer 150 executes a program similar to program P2 to determine gestures of hands and wrists, and to simulate motion of the hands and the wrists over the piano 640.

To be able to properly simulate movements of both the wrists over the piano 640, it is required to determine relative location of both the wrists from a single point of reference. The wearable devices 200a and 200b can determine the said relative location by using either of the following two methods.

In first method, the wearable device 200a processes images of left arm, captured by its secondary image sensors 141a and 142a, to determine location of the left wrist relative to the right wrist. The device 200a then uses inertia information from IMU 104 to determine the location of right wrist relative to an initial position. By using the above two types of location information, the location of left wrist relative to the said initial position can be easily be calculated.

In the second method, the wearable device 200a processes images of object 851 captured by its secondary image sensors 141a and 142a, to determine location of the right wrist relative to the object 851. Similarly the device 200b can also determine location of the left wrist relative to the object 851.

Similarly, with the wearable device 200, it is also possible to emulate other data input devices that requires relative location of both the wrists from a single point of reference, such as a computer keyboard, and electronic keyboard (music instrument), video game controller used for simulating both hands for a boxing game etc.

In another application, the wearable device 200 can be used as a hand gesture controlled camera, wherein the image sensors 141 and 142 are used to take pictures or video.

Hand gestures can be registered in the wearable device 200 to control the camera such as to take a picture, to zoom in and out, to select focus, to change shooting mode from still image mode to video mode, etc. When the user makes one of the said gestures, the matched camera operation is performed by the wearable device. For example, if the user makes a hand gesture, which is registered for taking a picture, the wearable device determines this gesture by processing the tracking data primarily from the image sensors 101, 102 and the IMU 104, captures an image using the secondary image sensor 141, and stores the captured image in nonvolatile memory 111. Similarly other functions of the camera can also be implemented.

Example 3

This embodiment of the present invention describes a wrist wearable device 300 that is similar to the wearable device 100 explained in embodiment 1, but the computer device 150 in this embodiment is a wrist wearable computer device attached on top of the strap 119. In this embodiment the said computer device 150 can be similar to some well known wrist wearable computer devices such as the one explained in PTL 4. The wearable device 300, tracks motion of user's hand and wrist, and determines gestures of the hand and the wrist, and sends the data registered for the determined gesture to the attached computer device 150 or to a second computer device 150b which may not be a wearable computer. Wearable computer 150 can be used to control functions of the wearable device 300, such as for selecting a data input device for emulation.

Figure 16:
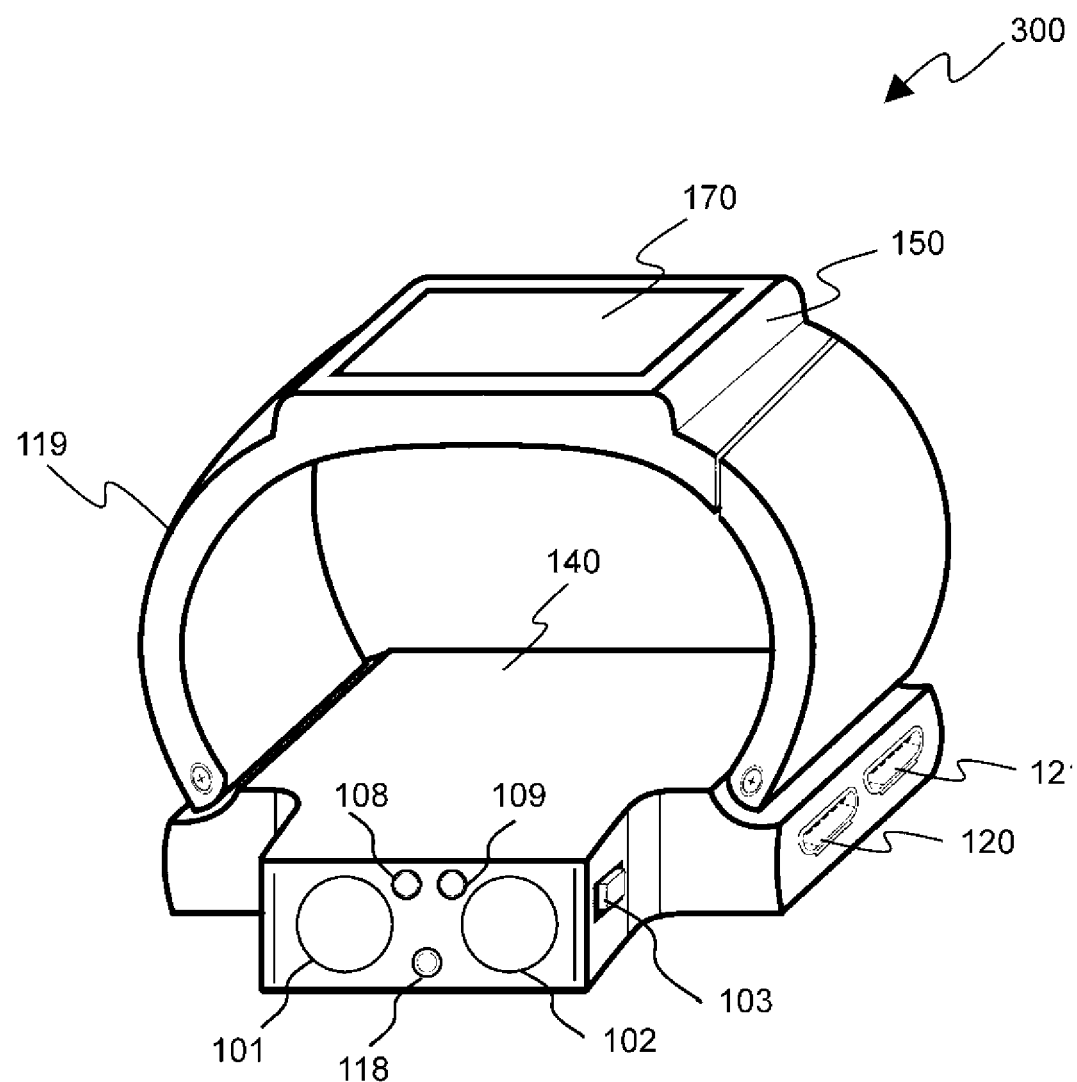
FIG. 16 illustrates an example structure of wearable device 300 according to third embodiment.

FIG. 16 is an illustration of an example structure of wearable device 300 according to this embodiment of the present invention. 170 is a display screen such as a Liquid Crystal Display (LCD), of the computer device 150 and it is attached to the upper part of the strap 119. The wearable device can share its electronic components with the said computer device 150, or the computer device 150 can have its own set of electronic components. The said electronic components may include processor unit 110, nonvolatile memory 111, RAM 112, communication ports 113 and 114, etc.

The said computer device 150 may run an operating system such as 'Android Wear' from Google Inc. and is able to display text and graphical data. It is also possible to install software applications on the computer device 150 that make use of determined hand gestures for purposes specific to each application.

The display screen 170 may be a touch screen and can be used as input interface to control functions of the wearable device 300, such as selecting a data input device for emulation.

The wearable device 300 can also communicate with and provide data to other various computer devices in similar way as explained in the case of the wearable device 100 of first embodiment.

INDUSTRIAL APPLICABILITY

The data input system including the wearable device and the methods disclosed in present invention is able to emulate various data input devices such as computer keyboard, computer mouse, video game controller, television remote control, etc. And can be used as a device to provide data input to various computer devices such as general purpose computer, tablet computer, smart phone, video game console, and also to home appliances such as television, DVD player, etc.

REFERENCE SIGNS LIST

100: Wearable device according to first embodiment of this invention
101: Image sensor 1
102: Image sensor 2
103: Emulation device selector switch
104: Inertia Measurement Unit (IMU)
105: Gyroscope sensor
106: Linear accelerometer sensor
107: Angular accelerometer sensor
108: Infra Red LED signal transmitter
109: Infra Red signal receiver
110: Processing unit
111: Nonvolatile memory
112: RAM module
113: Data transceiver
114: Command transceiver 115: Internal network
118: Light source
119: Strap
120: Micro USB data transceiver
121: Micro USB command transceiver
140: Housing for electronic components
141: Secondary image sensor 1
142: Secondary image sensor 2
150: Computer device
170: Display screen of wearable computer device
200: Wearable device according to the second embodiment of this invention
300: Wearable device according to the third embodiment of this invention
500: Emulation device configuration table
600: Display screen of computer device
601: Graphical representation of right hand of user
602: Graphical representation of left hand of user
610: Graphical representation of index finger of right hand of user
611: Graphical layout of computer keyboard
615: Window of text editing software
616: Text which user input
620: Computer mouse pointer
630: Handheld gun of video game
631: Target of video game
640: Virtual piano
800: Television
801: Infra Red signal receiver of television
802: Volume indicator of television
850: Flat surface
851: Computer recognizable object
901: Right hand of user
902: Left hand of user
910: Index finger of right hand of user
911: Finger tip
912: DIP joint
913: PIP joint
920: Wrist of user

CITATION LIST

Patent Literature

PTL 1: U.S. Patent Application Publication No: US20090322673
PTL 2: PCT Patent Application Publication No: WO2013127948
PTL 3: U.S. Patent Application Publication No: US20140098018
PTL 4: U.S. Pat. No. 8,787,006

The invention claimed is:

1. A data input system that includes a wearable device mounted on a wrist of a user and at least one computer device, wherein the wearable device provides gesture based data input to the computer device, the wearable device comprising:
at least one primary camera configured to capture images of a hand connected with the wrist on which the wearable device is mounted, and at least one first object in physical environment of the wearable device, in order to track movements of the hand and the wrist;
at least one inertia measurement unit comprising a gyroscope sensor and an accelerometer, wherein the at least one inertia measurement unit is configured to measure inertia information, which includes orientation, linear acceleration, and angular acceleration of the wrist on which the wearable device is mounted;
at least one wired or wireless communication interface for communicating with the computer device; and
a processor configured to:
determine position of the wrist in 3D space, a first relative position to an initial position of the wrist, and orientation of the wrist in 3D space, by processing the inertia information;
determine a relative orientation of the first object, with respect to the wrist, based on an analysis of images captured by the primary camera;
determine position of the wrist in 3D space, a second relative position to the first object, by processing the images captured by the primary camera; and
determine positions in 3D space of a fingertip, a PIP joint, and a DIP joint of at least one finger of the hand, a third relative position to at least one of the wearable device and a fourth relative position of the first object, by processing the images captured by the primary camera.

2. The data input system according to claim 1, wherein the wearable device includes two or more primary cameras in stereo configuration configured to capture stereo images of the hand and the first object, for more precise determination of at least one of the second relative position, the third relative position, and the fourth relative position.

3. The data input system according to claim 1, wherein the wearable device and the computer device are configured to share the processing of at least one of the inertia information and the images, and
determine at least one of the first relative position, the second relative position, the third relative position, the fourth relative position and the orientation.

4. The data input system according to claim 3, wherein the at least one wired or wireless communication interface is configured to transmit-tracking information of the hand and the wrist to the computer device, wherein the tracking information includes at least one of the following:
the images containing the hand and the first object;
the inertia information of the wrist; and
at least one of the first relative position, the second relative position, the third relative position, and the fourth relative position.

5. The data input system according to claim 4, wherein the computer device is configured to simulate motion of at least any one of the hand and the wrist in 3D space by processing the tracking information of the hand and the wrist, received from the wearable device.

6. The data input system according to claim 4, wherein the computer device is configured to determine at least one of the following gestures:
a discrete hand and wrist gesture in 3D space, based on the tracking information which is discrete; and
a contiguous motion hand and wrist gesture in 3D space based on a plurality of the tracking information which is contiguous.

7. The data input system according to claim 6, wherein the computer device is configured to:
emulate at least one user defined data input device that is used to provide data input to the computer device, by matching the determined gestures and at least one of the first relative position, the second relative position, and the third relative position with an emulation information of the data input device, and
read a data from the emulation information that is associated with the matched gestures at the matched relative positions, and using the said data for generating a software event or to control operations of the computer device, wherein the said emulation information is pre-registered in the computer device for each data input device that can be emulated by the computer device, and includes at least a set of hand and wrist gestures, positions of the gestures, and data associated with the each registered gesture and the position of the gesture; and the said data can be a data which the data input device sends to the computer device.

8. The data input system according to claim 7, wherein the at least one user defined data input device that is emulated by the wearable device or the computer device is at least one of the following:
a computer keyboard;
a computer mouse;
a touch pad for controlling a mouse pointer;
a video game controller which includes at least a joystick or a button; and
an electronic keyboard (musical instrument).

9. The data input system according to claim 7, wherein the wearable device and the computer device are further configured to control operations of the data input system, wherein the wearable device and the computer device comprises:
at least one selector switch provided in the wearable device;
a hand gesture that is registered for the control operation in at least one of the wearable device and the computer device: and
a command related to the control operations received by the wearable device and sent from the computer device.

10. The data input system according to claim 9, wherein the control operation is an operation for selecting at least one of the following:
the data input device for emulation;
at least one computer device as a target computer device for receiving data input from the wearable device, when the data input system includes a plurality of the computer devices; and
a communication interface to be used for communication between the wearable device and the computer device, when the wearable device is connected with the computer device through a plurality of communication interfaces.

11. The data input system according to claim 7, wherein the computer device is configured to be mounted on the wrist, includes a display unit, and is further configured to be attached to a strap of the wearable device, and wherein the computer device and the wearable device are configured to share a processor, a memory, and a communication port.

12. The data input system according to claim 1, wherein the processor is further configured to determine at least one of the following gestures:
a discrete hand and wrist gesture in 3D space, based on the tracking information which is discrete; and
a contiguous motion hand and wrist gesture in 3D space based on a plurality of the tracking information which is contiguous.

13. The data input system according to claim 12, wherein the processor is configured to emulate at least one user defined data input device that is used to provide data input to the computer device, by matching the determined gestures and at least one of the first relative position, the second relative position, and the third relative position with an emulation information of the data input device, and
read a data from the emulation information that is associated with the matched gestures at the matched relative positions, and sending the said data to the computer device, wherein
the said emulation information is preregistered in the wearable device for each data input device that can be emulated by the wearable device, and includes at least a set of hand and wrist gestures, positions of the gestures, and data associated with the each registered gesture and the position of the gesture;
the said data can be a data which the data input device sends to the computer device.

14. The data input system according to claim 13, wherein the wearable device further includes an Infra Red signal transmitter and receiver configured to communicate with Infra Red signal compatible devices, and the data input device emulated by the wearable device is a user defined remote control unit of an Infra Red signal transmission type, so that the wearable device can provide hand gesture based data input to the said Infra Red signal compatible devices.

15. The data input system according to claim 13, wherein the user defined data input device that is emulated by the wearable device or the computer device is at least one of the following:
a computer keyboard;
a computer mouse;
a touch pad for controlling a mouse pointer;
a video game controller which includes at least a joystick or a button; and
an electronic keyboard and musical instrument.

16. The data input system according to claim 13, wherein the wearable device and the computer device are further configured to control operations of the data input system, based on at least one of the following:
at least one selector switch provided in the wearable device;
a hand gesture that is registered for the control operation in at least one of the wearable device and the computer device: and
a command related to the control operations received by the wearable device and sent from the computer device.

17. The data input system according to claim 1, wherein the wearable device includes at least one or more secondary cameras mounted on a strap of the wearable device configured to capture images of at least one second object in physical environment of the wearable device, which is used for tracking movements of the wrist relative to the second object, wherein the second object may not be in a field of view of the primary camera.

18. The data input system according to claim 1, wherein the second object is at least one of the following:
other hand of the user; and
a computer recognizable pattern or fiducial marker which is preregistered in the wearable device or the computer device.

19. The data input system according to claim 1, wherein the processor is further configured to process the image of the hand and extracting a skin texture found at the PIP joint and the DIP joint on the inner side of the finger, where the said skin texture is perpendicular to the length of the finger and in general has a skin color that is different than a skin color of rest of the finger.

20. The data input system according to claim 1, wherein the control operation is an operation for selecting at least one of the following:

the data input device for emulation;

at least one computer device as a target computer device for receiving data input from the wearable device, when the data input system includes a plurality of the computer devices; and a communication interface to be used for communication between the wearable device and the computer device, when the wearable device is connected with the computer device through a plurality of communication interfaces.

21. A data input system that includes a wearable device mounted on a wrist of a user and at least one computer device, wherein the wearable device provides gesture based data input to the computer device, the wearable device comprising:

at least one primary camera configured to capture images of a hand connected with the wrist on which the wearable device is mounted, and at least one first object in physical environment of the wearable device, in order to track movements of the hand and the wrist;

at least one inertia measurement unit comprising a gyroscope sensor and an accelerometer, wherein the at least one inertia measurement unit is configured to measure inertia information, which includes orientation, linear acceleration, and angular acceleration of the wrist on which the wearable device is mounted;

at least one wired or wireless communication interface for communicating with the computer device;

at least one or more secondary cameras mounted on a strap of the wearable device configured to capture images of at least one second object in physical environment of the wearable device, which is used for tracking movements of the wrist relative to the second object, wherein the second object may not be in a field of view of the primary camera; and a processor configured to:

determine position of the wrist in 3D space, a first relative position to an initial position of the wrist, and orientation of the wrist in 3D space, by processing the inertia information;

determine a relative orientation of the first object, with respect to the wrist, based on an analysis of images captured by the primary camera;

determine position of the wrist in 3D space, a second relative position to the first object, by processing the images captured by the primary camera; and determine positions in 3D space of a fingertip, a PIP joint, and a DIP joint of at least one finger of the hand, a third relative position to at least one of the wearable device and a fourth relative position of the first object, by processing the images captured by the primary camera.

* * * * *